(12) United States Patent
Thiruchengode Vajravel et al.

(10) Patent No.: US 12,401,578 B2
(45) Date of Patent: Aug. 26, 2025

(54) SYSTEM AND METHOD FOR USING INTELLIGENT STAGGERED TELEMETRY FOR NODE CAPABILITIES MANAGEMENT ACROSS NODES IN A PERIPHERAL DEVICE WORKSPACE

(71) Applicant: Dell Products, LP, Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 29 days.

(21) Appl. No.: 18/430,063

(22) Filed: Feb. 1, 2024

(65) Prior Publication Data
US 2025/0254108 A1 Aug. 7, 2025

(51) Int. Cl.
*H04L 41/5009* (2022.01)
(52) U.S. Cl.
CPC .................. *H04L 41/5009* (2013.01)
(58) Field of Classification Search
CPC .................................................. H04L 41/5009
See application file for complete search history.

(56) References Cited

U.S. PATENT DOCUMENTS

| | | |
|---|---|---|
| 11,153,152 B2 | 10/2021 | Siddiqi |
| 11,310,304 B1 | 4/2022 | Tyer |
| 11,831,491 B2 | 11/2023 | Siddiqi |
| 2016/0254968 A1 | 9/2016 | Ebtekar |
| 2020/0044943 A1* | 2/2020 | Bor-Yaliniz ............ H04L 41/40 |
| 2020/0136994 A1* | 4/2020 | Doshi .................. H04L 41/0893 |
| 2021/0133318 A1 | 5/2021 | Andrews |
| 2022/0198043 A1 | 6/2022 | Kozlowski |
| 2022/0300313 A1 | 9/2022 | Iyer |
| 2022/0326929 A1* | 10/2022 | Sharma .................. H04L 63/08 |
| 2022/0391498 A1 | 12/2022 | Andrews |
| 2023/0056042 A1 | 2/2023 | Vichare |

(Continued)

*Primary Examiner* — Tonia L Dollinger
*Assistant Examiner* — Mehulkumar J Shah
(74) *Attorney, Agent, or Firm* — Prol Intellectual Property Law, PLLC; H. Kenneth Prol

(57) ABSTRACT

A system and method for a peripheral device workspace cloud orchestrator server to receive environmental telemetry data associated with a plurality of device nodes within a peripheral device workspace at a location that includes an anchor information handling system node with a hardware processor to execute computer-readable program code of a telemetry ownership orchestrator module to determine to offload a portion of environmental telemetry data collection and aggregation functions to be transitioned to a smart device node within the peripheral device workspace from the anchor information handling system node when a resource utilization level at the anchor information handling system node is determined to reach a utilization threshold, and transmitting instructions to the anchor information handling system node to offload the portion of environmental telemetry data collection and aggregation functions for a subset of the plurality of peripheral device nodes in the peripheral device workspace to the smart device node.

20 Claims, 11 Drawing Sheets

(56) References Cited

U.S. PATENT DOCUMENTS

| | | |
|---|---|---|
| 2023/0080498 A1 | 3/2023 | Barhoumeh |
| 2023/0134096 A1 | 5/2023 | Boyapalle |
| 2023/0146736 A1 | 5/2023 | Vajravel |
| 2023/0222200 A1 | 7/2023 | Grobelny |
| 2023/0325522 A1 | 10/2023 | Kozlowski |
| 2024/0020212 A1 | 1/2024 | Andrews |

* cited by examiner

SYSTEM AND METHOD FOR USING INTELLIGENT STAGGERED TELEMETRY FOR NODE CAPABILITIES MANAGEMENT ACROSS NODES IN A PERIPHERAL DEVICE WORKSPACE

FIELD OF THE DISCLOSURE

The present disclosure generally relates to automatic orchestration and collection of telemetry data of peripheral device workspace nodes within a peripheral device workspace. The present disclosure more specifically relates to orchestrating and collecting telemetry data from information handling system nodes, smart device nodes, and peripheral device nodes within a peripheral device workspace to manage various capabilities of those nodes related to the set of detected operating context data of executing applications of anchor information handling system nodes such as a user's information handling system or smart nodes within that peripheral device workspace.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more applications such as workplace productivity applications or a gaming application. The information handling system may be operatively coupled to a cloud server information handling system via a network connection. Further, the information handling system may be operatively coupled to a plurality of peripheral devices that include smart peripheral devices at a location and the information handling system may be operatively coupled to a cloud server information handling system via a network connection.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
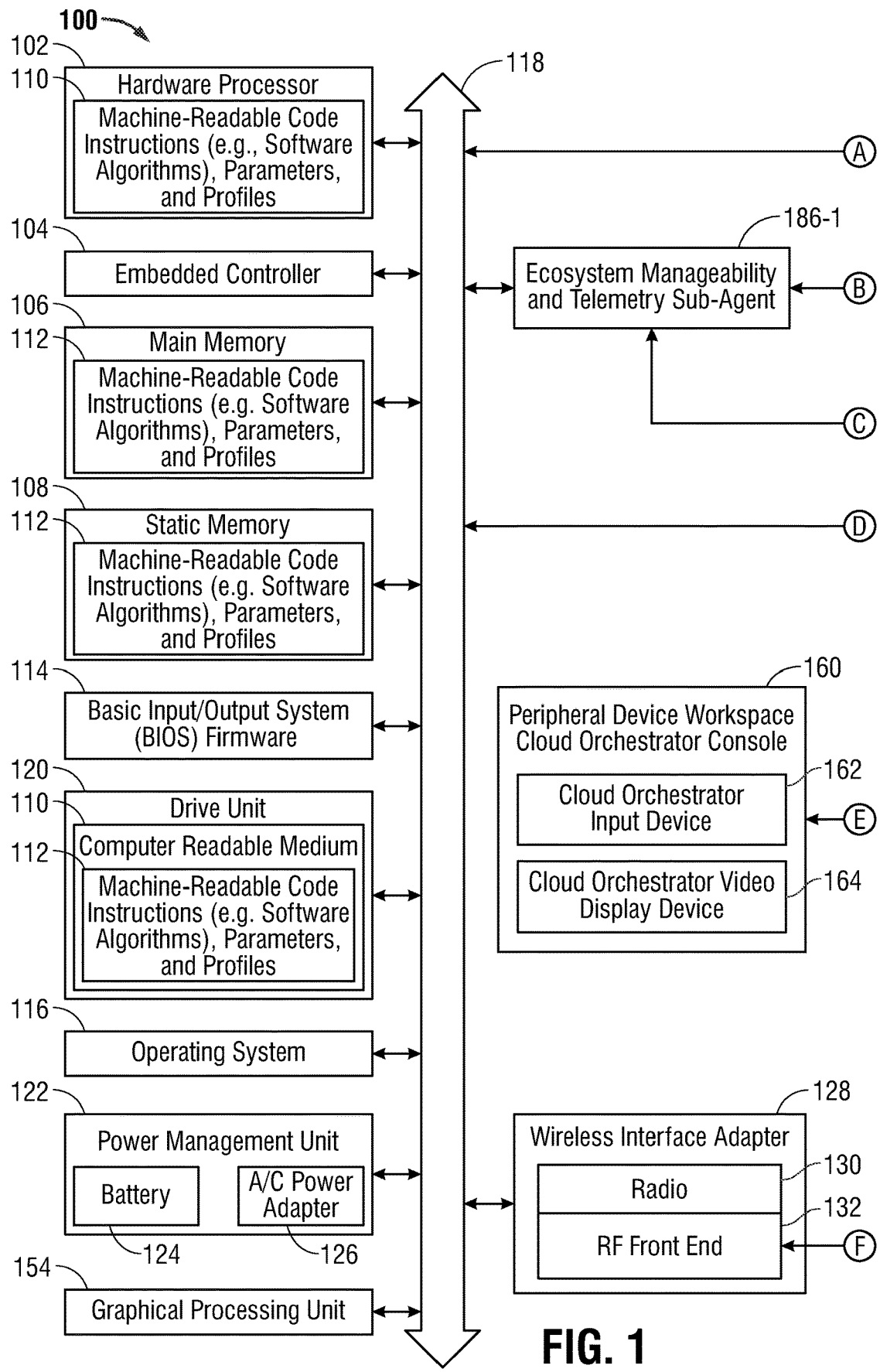
FIG. 1 is a block diagram illustrating an information handling system operatively coupled to a remotely located peripheral device workspace cloud orchestrator server for management of peripheral device workspaces in an enterprise according to an embodiment of the present disclosure.
Figure 1:
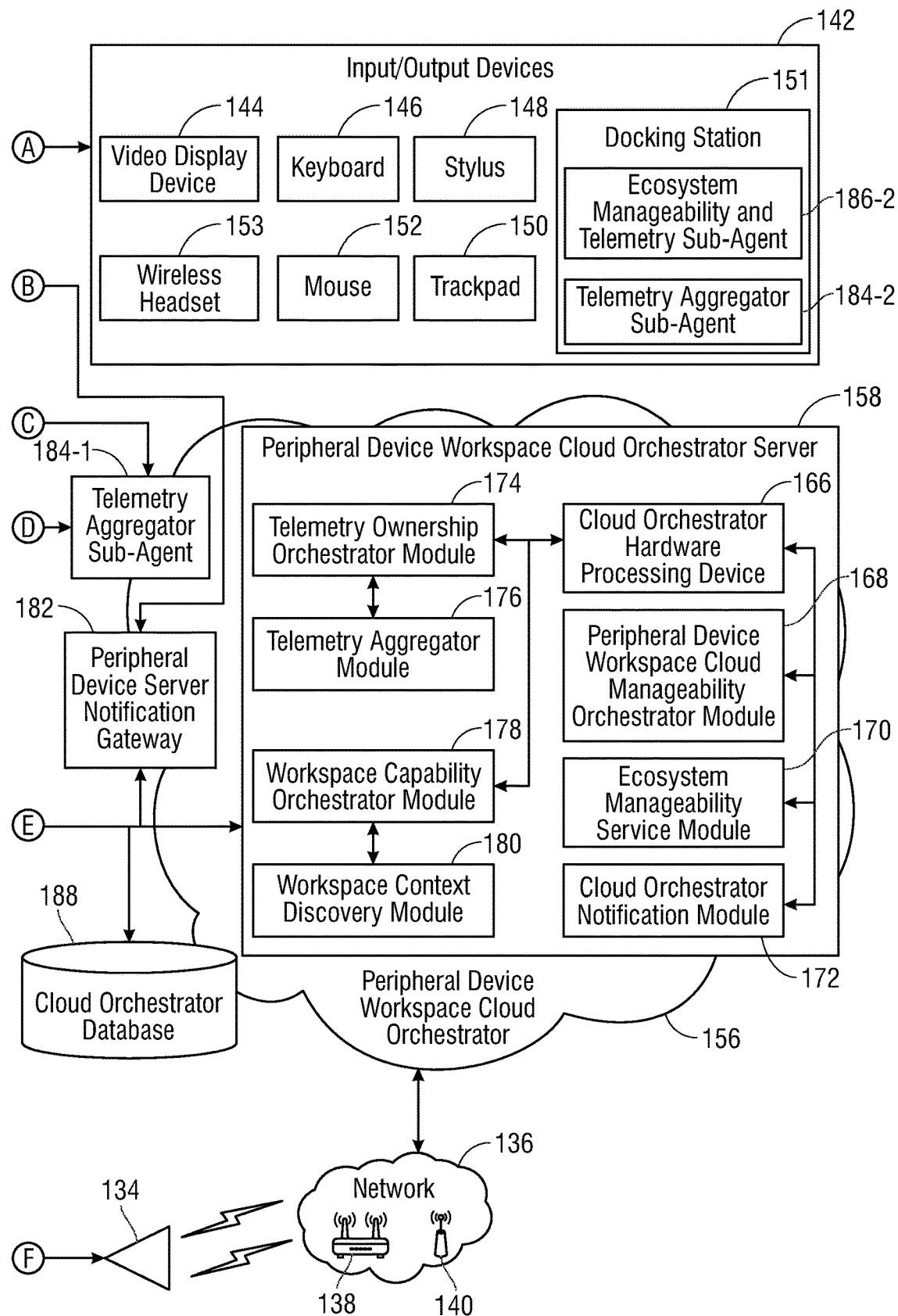

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

A user may oftentimes use an information handling system at a physical location in a peripheral device workspace. In this context, a peripheral device workspace can be viewed as an environment that includes a user information handling system (e.g., a laptop) as an anchor information handling system node or primary node and one or more peripheral devices as peripheral device nodes also referred to as peripherals that are connected to the user information handling system at an identified location. Any number of peripheral device may be operatively coupled to the anchor information handling system node and may include smart device nodes that include, in some example embodiments, a hardware processing resource and/or network communication capabilities. The location, and a manifest of these device nodes at that physical location define a peripheral device workspace that is associated with a peripheral device workspace identification value. In an embodiment, some of the peripheral devices operatively coupled to the anchor information handling system node may be a smart peripheral device. A smart peripheral device may include any peripheral device that can be operatively coupled to a network as well as those peripheral devices that include computing resources such as data storage resources, processing resources, and power resources, among other resources. In an embodiment, each of the information handling systems, smart peripheral devices, and peripheral devices within these peripheral device workspaces may be referred to as device nodes and form part of these peripheral device workspaces.

According to embodiments herein, a formed peripheral device workspace may oftentimes be used for various work scenarios. For example, a business may have an office space that includes hoteling cubes that can be assigned to, reserved by, or otherwise utilized by the business' employees as peripheral device workspaces for use with one or more peripheral devices and an information handling system introduced to the peripheral device workspace for the duration it is used by the identified user, for example, a business' employee. In such an example case, the business may allow its individual employees to connect their laptops to a docking station or to peripheral devices directly in a particular hoteling cube having a formed peripheral device workspace where various external peripherals may be available for use. The docking station, in some example embodiments, may be a smart peripheral device that includes a hardware processing device, a data storage device, and/or a wireless radio device capable of operatively coupling the docking station to a network in some example embodiments. Users may also employ other peripheral device workspaces when working from home or other locations and the information handling system and some portion of the external peripheral devices may travel with the user to one or more of the identified peripheral device workspaces that a particular user may enter and use. The plurality of peripheral device workspaces associated with a user and a user identification may be defined under a composite user peripheral device workspace identifier and stored in a cloud orchestrator database.

As users are interacting with the peripheral device nodes including the anchor information handling system nodes, smart peripheral devices, and other peripheral device nodes, the anchor information handling system node may collect telemetry data. This telemetry data may include, for example, any data, in situ of each of the peripheral device nodes. Some specific examples of telemetry data may include, but are not limited to, Input/Output (I/O) operation load on the peripheral device nodes, memory usage the peripheral device nodes, storage usage the peripheral device nodes, CPU/hardware processor power utilization of the peripheral device nodes, connectivity types, connectivity quality, application and/or hardware uptime and downtime of the peripheral device nodes, user information, application errors and exceptions, database accesses of each of the peripheral device nodes, latency, web log information, and database errors and warnings. This telemetry data may be generated at and received from each of the individual peripheral device nodes in a peripheral device workspace. However, this telemetry data is typically collected at an anchor information handling system node such as an anchor information handling system node. Typically, this telemetry data is then used by the information handling system to provide orchestration recommendations for the peripheral device nodes across the peripheral device workspace. However, with the anchor information handling system node executing software, firmware, and application data via its hardware processor, the collection of the telemetry data and calculations related to the provision of recommendations for management of a peripheral device workspace may consume valuable processing resources reducing the quality of experience (QoE) by the user at the anchor information handling system node.

The present specification describes computer-readable program code of an ecosystem manageability service module executing at a peripheral device workspace cloud orchestrator server that, when executed by a hardware processor of the peripheral device workspace cloud orchestrator server, directs for telemetry data to be collected by a plurality of peripheral device workspace telemetry sub-agents executed by the hardware processors of each anchor information handling system nodes. In an embodiment, execution of computer-readable program code of a telemetry aggregator module selectively aggregates this telemetry data from an anchor information handling system node and/or smart device node depending on key performance indicator (KPI) data received from each of the device nodes within the peripheral device workspace. Additionally, each of the anchor information handling system node and one or more smart device nodes may execute computer-readable program code of an ecosystem manageability sub-agent that sends the KPI data related to each peripheral device nodes, smart device nodes, and the anchor information handling system node to the peripheral device workspace cloud orchestrator server executing the computer-readable program code of the telemetry aggregator module. This KPI data may be included within the telemetry data and may include processing performance KPI, battery availability KPI, audio KPIs, video KPIs, and the like that is used to orchestrate the offloading of collection and assessment of telemetry data collected by the anchor information handling system node and smart device nodes when KPI threshold levels indicate that one of the anchor information handling system node or smart device nodes should have the telemetry gathering responsibilities associated with their respective peripheral device nodes or accessing offloaded to it. This may be done by the peripheral device workspace cloud orchestrator server directing, for example, the smart device node to conduct the telemetry orchestration (e.g., collection and assessment of telemetry data) from each device node within the peripheral device workspace based on currently-received peripheral device telemetry data related to the KPIs and received at the peripheral device workspace cloud orchestrator server. For example, the peripheral device workspace may include the anchor information handling system node that is operatively coupled directly to secondary peripheral device nodes of a keyboard and mouse as well as to a docking station. The docking station, in turn, may be operatively coupled to secondary peripheral device nodes of an external monitor, a webcam, and an audio device such as a speaker or a headset. Typically, the anchor information handling system node may handle all the telemetry collection and aggregation responsibilities even for the external monitor, webcam and audio device operatively coupled to the docking station. However, the hierarchy of this telemetry data collection may be changed from the anchor information handling system node being solely responsible for this collection and aggregation to the anchor information handling system node and docking station splitting responsibility for the collection and aggregation of telemetry data associated with their owned, respective peripheral device nodes. Each of the anchor information handling system node and smart node device which may split collection and aggregation of telemetry data may have network access to the peripheral device workspace cloud orchestration server managing the peripheral device workspace. The peripheral device workspace cloud orchestrator server, in this example embodiment, may determine when any offloading of telemetry collection and aggregation as it relates to individual peripheral device nodes within the workspace is to occur due to high level of processing, memory, or communications activity at the anchor information handling system node or the smart device node.

In an embodiment, the peripheral device workspace cloud orchestrator server may execute the computer-readable program code of a telemetry ownership orchestrator module to map the telemetry data received and aggregated from the anchor information handling system node to each device node in the peripheral device workspace and determine, based on the KPI data and device node capabilities, whether telemetry aggregation functions are to be, at least partially, transitioned to a smart device node within the peripheral device workspace. The execution of the telemetry ownership orchestrator module to send a transitional offload mapping to the anchor information handling system node and smart device nodes that indicates, based on current KPI data, which of the anchor information handling system node and smart device node is to conduct this telemetry orchestration. This transitional offload mapping may indicate to either of the chosen anchor information handling system node or smart device node those peripheral devices that are to send telemetry data and, based on the received telemetry data, orchestrate operational recommendations for the peripheral device nodes across the peripheral device workspace.

As described herein, the environmental telemetry data for nodes in a peripheral device workspace may include any data that may affect the QoE by a user of the peripheral device workspace. For example, this environmental telemetry data may be data descriptive of current and available processing resources in each peripheral device node (including the anchor information handling system node and smart device node), current and available resources in each peripheral device node, current power sources of each of the peripheral device nodes, current battery levels within each peripheral device nodes, current methods of operatively coupling the smart nodes and peripheral devices to the anchor information handling system node, as well as executing software applications and software data (e.g., scheduled videoconferencing sessions and length of the videoconferencing sessions), among other environmental telemetry data.

When the ecosystem manageability sub-agent of the selected anchor information handling system node or smart device node receives this environmental telemetry data from each of the peripheral device nodes being monitored within the peripheral device workspace, it may cache this environmental telemetry data at, for example, a telemetry database in a cloud orchestrator database for use during management of operation of nodes within the peripheral device workspace. Further, execution of the computer-readable program code of the ecosystem manageability sub-agent causes the ecosystem manageability sub-agent to analyze trends associated with the use of the anchor information handling system node, smart nodes, and peripheral devices as well as the execution of applications on the anchor information handling system nodes to determine whether QoE notifications should be sent out to the anchor information handling system nodes and users operating the anchor information handling system nodes indicating that changes to the QoE will be experienced unless changes to operations of the anchor information handling system node, smart peripheral device nodes, and peripheral devices are taken by the user.

In an embodiment, the execution of computer-readable program code of a workspace capability orchestrator module by the cloud orchestrator hardware processing device of the peripheral device workspace cloud orchestrator server allows for the peripheral device workspace cloud orchestrator server to identify duplicate or overlapping capabilities among peripheral device nodes within any created peripheral device workspace. Additionally, this duplicate or overlapping capability data among the peripheral device nodes may be accessed and used to select between capabilities at those nodes or prioritization among capabilities at those peripheral device nodes to maintain a QoE. For example, where the peripheral device workspace includes a web cam that is built into the chassis of the anchor information handling system node and an external web cam is also operatively coupled to the anchor information handling system node, the selection of which web cam to use may be based on which web cam has the best image sensor, resolution, largest number of potential settings available, and other characteristics of the two web cams. This may increase the QoE for the user.

The systems and methods described herein, therefore, allows the anchor information handling system node and operatively-coupled smart device nodes to cooperate in the collection of environmental telemetry data for transmission to the peripheral device workspace cloud orchestrator server which may execute code instructions of a peripheral device workspace cloud orchestrator for orchestration of operational recommendations to each peripheral device node within the peripheral device workspace. This allows the processing resources within, for example, the anchor information handling system node to be used for the execution of other applications thereby reducing the consumption of processing resources at the anchor information handling system node. This increases the QoE realized at the anchor information handling system node even when processing-intensive applications are being executed on the anchor information handling system node in a peripheral device workspace.

Turning now to the figures, FIG. 1 illustrates an anchor information handling system node 100 similar to the information handling systems according to several aspects of the present disclosure. In the embodiments described herein, an anchor information handling system node 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an anchor information handling system node 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality. It is appreciated that, in some embodiments herein, the information handling system 100 may be an anchor information handling system node (also referred to herein as the anchor information handling system node 100) and may be one of a plurality of device smart nodes or user information handling system nodes as part of a peripheral device workspace. Systems similar to the information handling system 100 may also operate as one or more peripheral device workspace cloud orchestrator servers 158 that are operatively coupled to a peripheral device workspace cloud orchestrator consol 160 graphical user interface and may execute code instructions of one or more software modules or systems of the peripheral device workspace cloud orchestrator 156 described herein. In an embodiment, the cloud orchestrator consol 160 may be an information handling system 100 itself that is used by an internet technology decision maker (ITDM) to create hardware device operational policies with one or more peripheral device workspace cloud orchestrator servers 158 to be propagated down to device nodes within a collaborative peripheral device workspace such as the anchor information handling system node 100, a docking station 151, video display device 144, keyboard 146, stylus 148, trackpad 150, mouse 152, wireless headset 153, and the like which may be attached or separate devices from anchor information handling system node 100 in embodiments described herein. In this embodiment, the anchor information handling system node 100, may receive the hardware device operational policies generated by the ITDM at the peripheral device workspace cloud orchestrator consol 160 via execution of code instructions of the cloud manageability orchestrator module 168 at the peripheral device workspace cloud orchestrator server 158 as described in embodiments herein.

Thus, in a networked deployment, the information handling system 100 may operate in the capacity of a client computer in a server-client network environment, or as a peer computer system in a peer-to-peer (or distributed) network environment. In an embodiment, the information handling system node 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single anchor information handling system node 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof which may be internal and/or external devices to the anchor information handling system node 100 in various embodiments. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of code instructions (e.g., software algorithms), parameters, and profiles 112 may operate on a plurality of information handling systems 100. Example software or firmware sets of executable code instructions may include the peripheral device workspace cloud orchestrator 156 which may include plural software modules such as cloud manageability orchestrator module 168, ecosystem manageability service module 170, cloud orchestrator notification module 172, telemetry ownership orchestrator module 174, telemetry aggregator module 176, workspace capability orchestrator module 178, and workspace context discovery module 180, among others such as operating systems and the like on an information handling system 100 operating as a peripheral device workspace cloud orchestrator server 158 in some embodiments. Other example software or firmware sets of executable code instructions may include the telemetry aggregator sub-agent 184-1, 184-2 and ecosystem manageability and telemetry sub-agent 186-1, 186-2 among others such as operating systems 116 and the like on an information handling system 100 operating as an anchor information handling system node at a peripheral device workspace in some embodiments.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The anchor information handling system node 100 may also include one or more buses 118 operable to transmit communications between the various hardware components and peripheral devices such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the anchor information handling system node 100 may be in wired or wireless communication with the I/O devices 142 such as a docking station 151, a keyboard 146, a mouse 152, video display device 144, stylus 148, or trackpad 150 among other peripheral devices that may be peripheral device nodes in a peripheral device workspace.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment.

Additionally, as described herein, the information handling system 100 serving as an anchor information handling system node 100 may include or be operatively coupled to one or more other I/O devices 142 including the wired or wireless mouse 152 described herein that allows the user to interface with the anchor information handling system node 100 via the video/graphics display device 144, a cursor control device (e.g., a trackpad 150, or gesture or touch screen input), a stylus 148, and/or a keyboard 146, among others. The anchor information handling system node 100 may also be operatively coupled to any peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may be a device node associated with the anchor information handling system node 100 and may be part of a peripheral device workspace on its own and identified with a peripheral device workspace identification value via execution of the cloud manageability orchestrator module 168 as described herein. Various drivers and hardware control device electronics may be operatively coupled to operate the I/O devices 142 according to the embodiments described herein. The present specification contemplates that the I/O devices 142 may be wired or wireless.

A network interface device of the information handling system 100, such as wireless interface adapter 128 or a wired network interface device can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation of peripheral device workspaces and orchestration of different device nodes within one or more peripheral device workspaces. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the anchor information handling system node 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the anchor information handling system node 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the anchor information handling system node 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device or wireless interface adapter 128. It is appreciated that any computing device including the cloud orchestrator server 158, the cloud orchestrator console 160, and the anchor information handling system node 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of anchor information handling system node 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the anchor information handling system node 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the anchor information handling system node 100 is operatively coupled to a peripheral device workspace cloud orchestrator 156 executing on a peripheral device workspace cloud orchestrator server 158 over a network that includes any number of servers, computing devices, and other cloud computing resources such as the peripheral device workspace cloud orchestrator server 158. The peripheral device workspace cloud orchestrator 156 may, therefore, execute on and include any hardware of one or more peripheral device workspace cloud orchestrator servers 158 that may be distributed over multiple physical locations but act in concert with each other. The peripheral device workspace cloud orchestrator 156 is executed on the peripheral device workspace cloud orchestrator server 158 to facilitate, in an example embodiment, an ITDM to, via hardware device operational policies, cause a peripheral device workspace to be created that includes any number of device nodes (e.g., including the anchor information handling system node 100 as an anchor device node and a plurality of secondary nodes including smart device nodes and peripheral device nodes) forming part of the peripheral device workspace after receiving device enrollment data describing one or more device nodes. In an embodiment, the ITDM may also create hardware device operational policies that, based on the registered device nodes detected within the one or more created collaborative peripheral device workspaces, facilitate the operations of the various nodes within the collaborative peripheral device workspace. In an embodiment, the ITDM may cause hardware device operational policies to be applied to the created collaborative peripheral device workspace. It is appreciated that the device nodes described herein may include each of the peripheral device nodes operatively coupled to the anchor information handling system node 100 which acts as a primary or anchor information handling system node 100 and the peripheral device workspaces created may be described and identified with a peripheral device workspace identification values. In an embodiment, the peripheral device workspace identification values may be stored on the cloud orchestrator database 188 by the peripheral device workspace cloud orchestrator server 158.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute computer-readable program code of the cloud manageability orchestrator module 168, ecosystem manageability service module 170, cloud orchestrator notification module 172, telemetry ownership orchestrator module 174, telemetry aggregator module 176, workspace capability orchestrator module 178, workspace context discovery module 180, and other software or firmware as described herein.

As described herein, the peripheral device workspace cloud orchestrator server 158 includes a computer-readable program code of a peripheral device workspace cloud manageability orchestrator module 168 that, when executed by the cloud orchestrator hardware processing device 170 of the peripheral device workspace cloud orchestrator server 158, uses device enrollment data describing one or more device nodes to create a manifest of the device nodes within the peripheral device workspace. The execution of the peripheral device workspace cloud manageability orchestrator module 168 creates a manifest of device nodes at an identified physical location of the peripheral device workspace with the peripheral device workspace having a peripheral device workspace identification value stored at the cloud orchestrator database 188 and accessible to the peripheral device workspace cloud orchestrator server 158. In the context of the present specification and in the appended claims, a peripheral device workspace may be an ecosystem of device nodes (e.g., including a location identifier and peripheral devices coupled to the anchor information handling system node 100, a docking station 151, etc.) connected to a primary or anchor device node such as the anchor information handling system node 100. In an embodiment, a peripheral device workspace may also be defined with a peripheral device workspace identification value and part of a user composite peripheral device workspace identifier and a type-classification for the type of peripheral device workspace associated with each of the anchor information handling system node 100 and peripheral device nodes (e.g., input/output devices 142) such that a user may have multiple peripheral device workspaces having peripheral device workspace identification values associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the device nodes included within the peripheral device workspace and the location identifier of the physical location for the peripheral device workspace (e.g., defined by location data such as GPS data as well as network data) and having a peripheral device workspace identification value.

The peripheral device workspace cloud orchestrator server 158 may also execute computer-readable program code of an ecosystem manageability service module 170. Execution of the ecosystem manageability service module 168 causes the peripheral device workspace cloud orchestrator server 158 to apply the hardware device operational policies created by the ITDM at the peripheral device workspace cloud orchestrator console 160 to the created peripheral device workspace. In an embodiment, the peripheral device workspace cloud manageability orchestrator module 168 creates hardware device operational policies for each of the one or more node devices within the peripheral device workspace based on received hardware device operational policies created by the ITDM. As described herein, the ecosystem manageability service module 168 may identify those peripheral devices that form part of the peripheral device workspace having a peripheral device workspace identifier value and may propagate those hardware device operational policies that apply to those peripheral devices. For example, where a plurality of peripheral device workspaces with a plurality of peripheral device workspace identifier values each include a specific wireless mouse that the ITDM has created a hardware device operational policy for, the execution of the computer-readable program code of the ecosystem manageability service module 168 causes the peripheral device workspace cloud orchestrator server 158 to send those hardware device operational policies to the appropriate peripheral device workspace (e.g., to each of the central, main, or anchor node devices) so that those hardware device operational policies may be passed to the wireless mice in each peripheral device workspace having a peripheral device workspace identifier value where such as specific mouse model or type is located.

Still further, the cloud orchestrator hardware processing device 166 of the peripheral device workspace cloud orchestrator server 158 may execute computer-readable program code of a telemetry aggregator module 176. Execution of the telemetry aggregator module 176 causes the peripheral device workspace cloud orchestrator server 158 to aggregate telemetry data and KPI data associated with the device nodes within the peripheral device workspace or plural peripheral device workspaces received by the peripheral device workspace cloud orchestrator server 158 from a telemetry aggregator sub-agent 184-1, 184-2 executing on the anchor information handling system node 100. This aggregation process includes, in an embodiment, adding metadata to the telemetry data that categorizes the telemetry data into categories such as the type of peripheral device the telemetry data has originated from, the type of telemetry data originating from that device node, current settings at that device node, potential settings at that device node, among others. It is appreciated that this environmental telemetry data may form a context in which the device nodes are operating in a peripheral device workspace. For example, a first device node may be a built-in video display device (e.g., at a laptop) and a second device node may be an external video display device. In this example embodiment, the telemetry data associated with the built-in video display device may include metadata that categorizes the resolution data of the environmental telemetry data from the built-in video display device, the current display settings of the telemetry data from the built-in video display device, and so on may be labeled and aggregated with display device environmental telemetry data. Similarly, the environmental telemetry data associated with the external display device may include metadata that categorizes the resolution data of the telemetry data from the external display device, the current display settings of the telemetry data from the external video display device, and so on may be labeled and aggregated with display device environmental telemetry data.

The environmental telemetry data itself may include any data, in situ of each of the peripheral device nodes within the created peripheral device workspace. Some specific examples of environmental telemetry data may include, but are not limited to, Input/Output (I/O) operation load on the peripheral device nodes, memory usage the peripheral device nodes, storage usage the peripheral device nodes, CPU/hardware processor power utilization of the peripheral device nodes, connectivity, wired or wireless connectivity quality, application and/or hardware uptime and downtime of the peripheral device nodes, user information, application errors and exceptions, database accesses of each of the peripheral device nodes, latency, web log information, and database errors and warnings. This telemetry data may be generated at and received from each of the individual peripheral device nodes in a peripheral device workspace. In an embodiment, the device nodes such as the anchor information handling system node 100 may execute computer-readable program code of a telemetry aggregator sub-agent 184-1, 184-2 to aggregate the environmental telemetry data from the device node and other device nodes for preparation and labelling of the environmental telemetry data to be sent to the peripheral device workspace cloud orchestrator server 158. Again, this aggregation process not only includes the accumulation of the environmental telemetry data from each peripheral device node, but also the categorization of that telemetry data by adding metadata that defines categories of the environmental telemetry data. In an embodiment, the anchor information handling system node 100 may, with the hardware processor 102, execute computer-readable program code of an ecosystem manageability and telemetry sub-agent 186-1, 186-2 to transmit this aggregated environmental telemetry data to the peripheral device workspace cloud orchestrator server 158.

In an embodiment, the cloud orchestrator hardware processing device 166 may execute the computer-readable program code of the telemetry aggregator module 176 to aggregate key performance indicator (KPI) data associated with the plurality of device nodes within the peripheral device workspace. These KPIs may include general performance KPIs, battery availability KPIs, application KPIs, audio KPIs, video KPIs, threshold battery power level KPIs, threshold temperature level KPIs, and processing resource level KPIs, memory resource level KPIs, network traffic level KPIs, or other KPIs. In an embodiment, these KPIs may be included as environmental telemetry data sent from the anchor information handling system node 100 about the anchor information handling system 100 and any smart device nodes having network access to the peripheral device workspace cloud orchestrator server 158. As described herein, the execution of the telemetry aggregator module 176 may also associate metadata to the environmental telemetry data that categorizes the environmental telemetry data to include categorization of this KPI data.

In an embodiment, the cloud orchestrator hardware processing device 166 executes computer-readable program code of a telemetry ownership orchestrator module 174 to map the environmental telemetry data received from the anchor information handling system node 100 to each device node in the peripheral device workspace and determine, based on the KPI data and device node capabilities, whether telemetry aggregation functions are to be transitioned, at least partially, to a smart device node within the peripheral device workspace that may have an independent network connection to the peripheral device workspace cloud orchestrator server 158. As described herein, the creation of the peripheral device workspace via execution of the peripheral device workspace cloud manageability orchestrator module 168, includes the receipt of capabilities associated with each device node within the peripheral device workspace. In an example embodiment, the peripheral device workspace may include the anchor information handling system node 100 that is operatively coupled directly to secondary peripheral device nodes such as a keyboard 146 and mouse 152 as well as to a docking station 151 acting as a smart device node within the same peripheral device workspace. The docking station 151 may also be operatively coupled further to secondary peripheral device nodes such as an external monitor 144, a webcam (not shown), and an audio device such as a speaker or a wireless headset 153. Typically, the anchor information handling system node 100 may handle all the environmental telemetry data collection and aggregation responsibilities even for the external monitor 144, webcam, and wireless headset 153 that is directly operatively coupled to the docking station 151. However, the hierarchy of this telemetry data collection may be changed from the anchor information handling system node 100 being solely responsible for this collection and aggregation to the anchor information handling system node 100 and docking station 151 both being responsible for the collection and aggregation of the telemetry data associated with their own respective secondary peripheral device nodes when necessary. The peripheral device workspace cloud orchestrator server 158, in this example embodiment, may determine whether any offloading of environmental telemetry data collection and aggregation is necessary, based on the KPI values, as it relates to individual peripheral device nodes within the workspace such as hardware resource utilization, memory resource utilization, or network traffic levels of the anchor information handling system node reaching threshold levels that may affect quality of experience and operations. In such example embodiments, some or all of the collection of environmental telemetry data and aggregation functions for secondary peripheral device nodes may be offloaded to a smart device node that is less busy.

The capabilities associated with and described in the aggregated environmental telemetry data may include, for example, video input/video output capabilities of the device node, audio input/audio output capabilities of the device node, network communication capabilities of the device node, processing capabilities of the device node, data storage capabilities of the device node, and wired or wireless connection capabilities of the device node (e.g., available ports or traffic levels), existing executable software/firmware stored on the device node, sensors present at the device node, security protocols present at the device node, among other capabilities. For example, a peripheral device workspace may include an external webcam, an internal webcam on the anchor information handling system node 100, a video display device 144, and an external video display device 144. Each of these device nodes may include hardware that defines their capabilities (via the environmental telemetry data aggregated therefrom) such as the external webcam having a microphone to capture audio input, a camera to capture video input, a universal serial bus cable currently inserted into a USB port on the anchor information handling system node 100, and a wireless interface adapter that can wirelessly couple the external webcam to the anchor information handling system node 100 instead of using a wired connection. All of these capabilities may be identified by the peripheral device workspace cloud orchestrator server 158 via the environmental telemetry data and the aggregation thereof after receiving device identification data from the anchor information handling system node 100. These capabilities may be mapped by the execution of a workspace context discovery module 180 to provide recommendations, based on the capabilities and a context in which the anchor information handling system node 100 is operating, indicating which functionalities should be switched from one device to another. For example, where the external webcam is removed from the anchor information handling system node 100 and, accordingly, from the peripheral device workspace, the execution of the workspace context discovery module 180 may provide a recommendation to switch those capabilities associated with the external webcam to the capabilities associated with the internal webcam. The mapped capabilities based on the aggregated environmental telemetry data may then be updated and provided to the anchor information handling system node 100 and smart node devices within the peripheral device workspace.

In an embodiment, the cloud orchestrator hardware processing device 166 of the peripheral device workspace cloud orchestrator server 158 may execute computer-readable program code of a workspace capability orchestrator module 178 to, based on the KPI data and context associated with each device node within the peripheral device workspace, provide peripheral device workspace recommendations to optimize configurations of the device nodes within the peripheral device workspace. The systems and methods described herein, therefore, allow for the partial offloading of environmental telemetry data collection and aggregation from one device node (e.g., anchor information handling system node 100) to another device node (e.g., smart device node) when KPI changes are detected as well that indicate one device node has reached threshold levels of hardware process utilization, memory utilization, or network traffic levels and switch the functionalities of collecting and aggregating environmental telemetry data for at least a portion of the node devices in a peripheral device workspace from one node device to another node device. This switch may occur when the context and KPIs indicate that, in order to maintain a quality of experience (QoE), for example, these functionalities should be switched.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
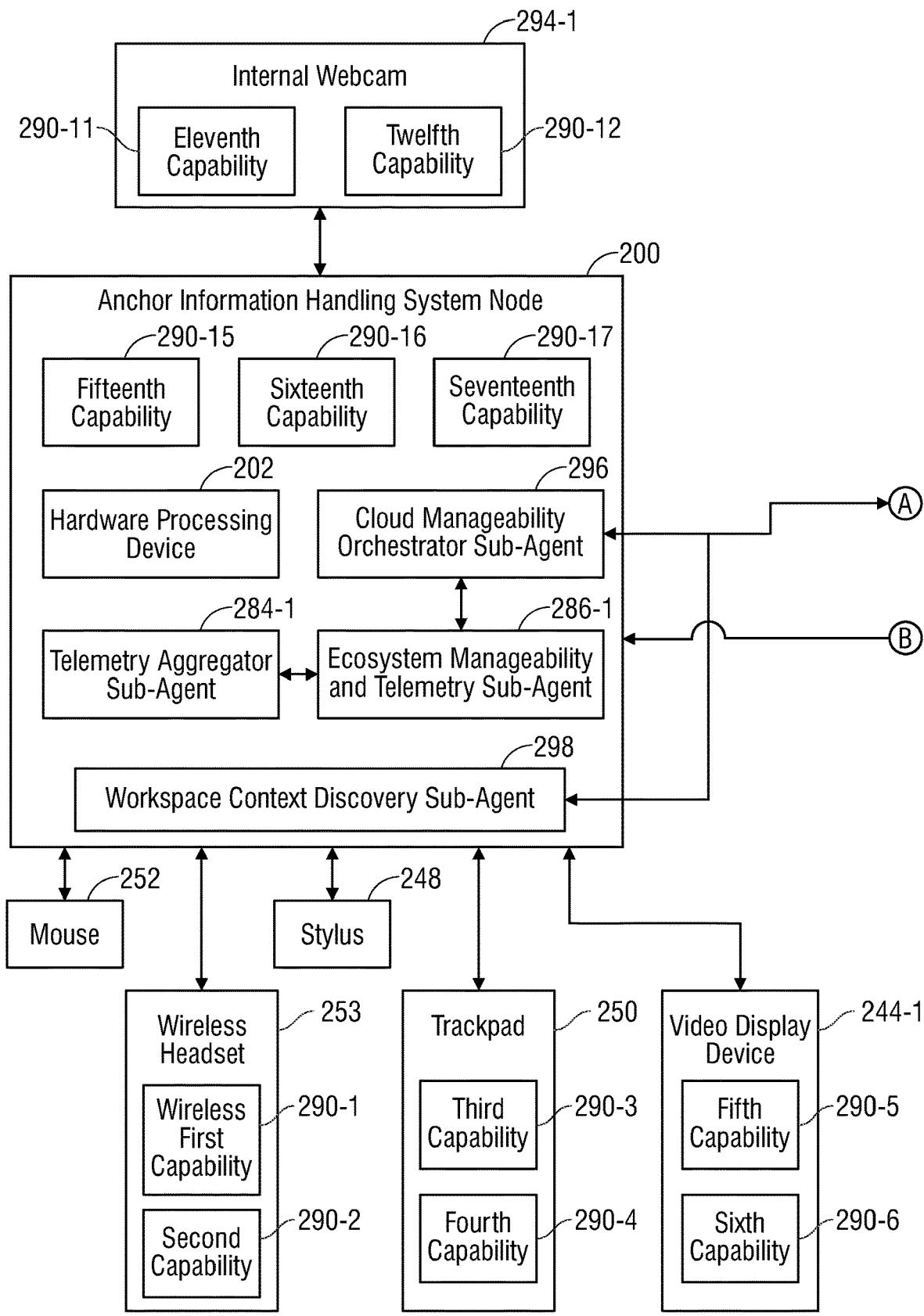
FIG. 2 is a graphic diagram of an anchor information handling system node forming a peripheral device workspace and including a plurality of peripheral device nodes that is operatively coupled to a peripheral device workspace cloud orchestrator server according to an embodiment of the present disclosure.
Figure 2:
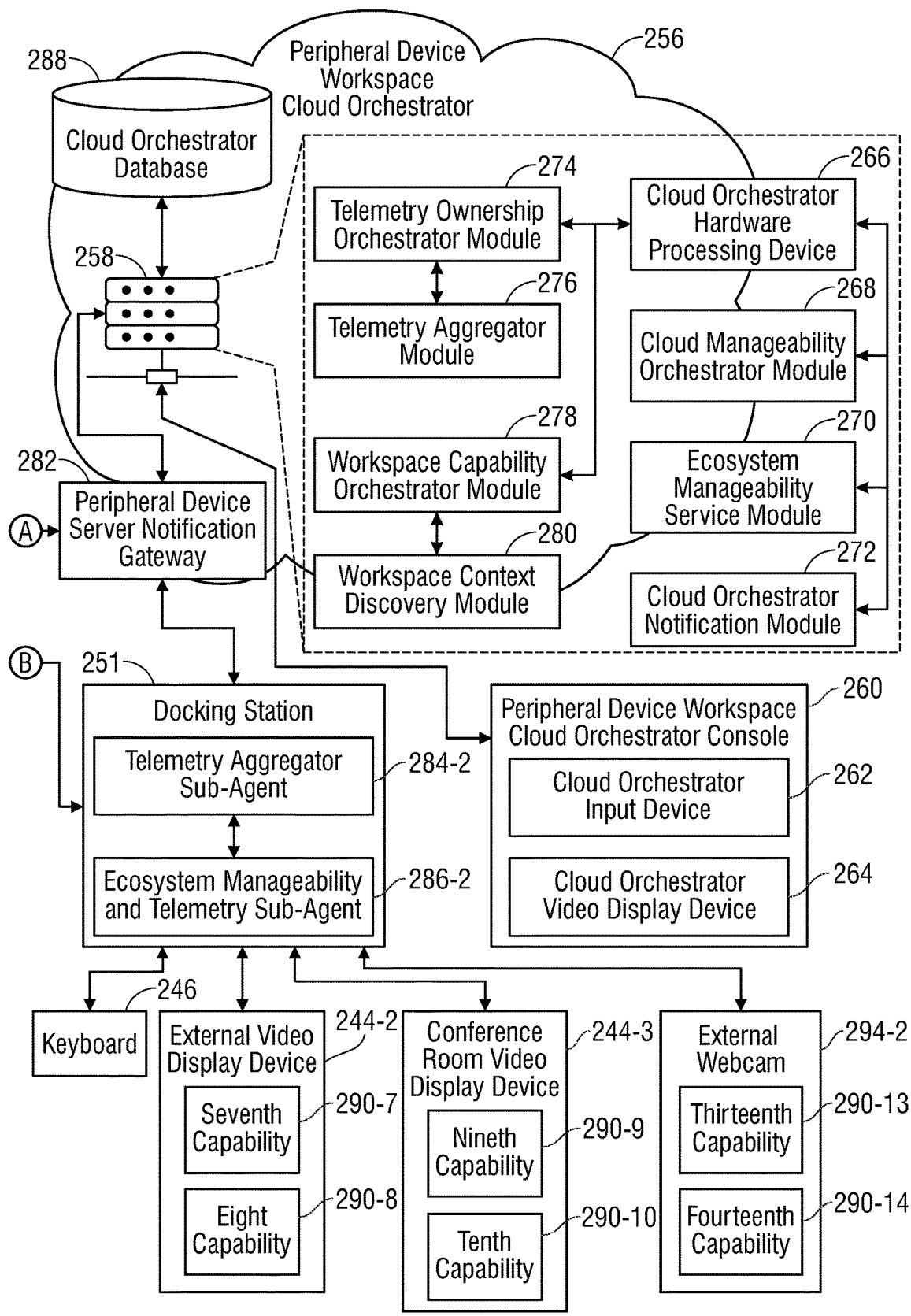

FIG. 2 is a graphic diagram of an anchor information handling system node 200 forming a peripheral device workspace and including a plurality of peripheral device nodes operatively coupled to the anchor information handling system according to another embodiment of the present disclosure. Further, the anchor information handling system node 200 is operatively coupled to a peripheral device workspace cloud orchestrator server 258 executing code instructions of one or more software modules for a peripheral device workspace cloud orchestrator 256 according to embodiments of the present disclosure. As described herein, the peripheral device workspace may include the anchor information handling system node 200 along with a plurality of other node devices. These node devices may include a mouse 252, a wireless headset 253, a stylus 248, a trackpad 250, a video display device 244-1, an internal webcam 294-1, a docking station 251, a keyboard 246, an external video display device 244-2, a conference room video display device 244-3, and an external webcam 294-2. As shown in FIG. 2, the keyboard 246, external video display device 244-2, conference room video display device 244-3, and external webcam 294-2 are operatively coupled to the docking station 251 with the docking station 251 coupled to the anchor information handling system node 200. This creates a hierarchy within the peripheral device workspace. Other secondary peripheral device nodes including mouse 252, a wireless headset 253, a stylus 248, a trackpad 250, a video display device 244-1, an internal webcam 294-1 are operatively coupled directly with the anchor information handling system node 200. It is appreciated that the peripheral device nodes shown in FIG. 2 are merely representative of a few potential peripheral device nodes that may be operatively coupled to the anchor information handling system 200 or through the docking station 251 and forming part of the peripheral device workspace. It is appreciated that other peripheral device workspaces may be formed that may include a different set of peripheral device nodes within those peripheral device workspaces.

In the example shown in FIG. 2, the peripheral device workspace may include a smart device node such as a docking station 251. As described herein, the docking station 251 may be identified as a smart device node due to the inclusion of a hardware processing device and/or network connection capabilities. This allows the docking station 251, for example, to act as a telemetry aggregator instead of the anchor information handling system node 200 being solely operating as the environmental telemetry data collector and aggregator for the peripheral device workspace for data on nodes, their operation, their connectivity, and their power states among other environmental telemetry data. According to embodiments herein, the switch between the anchor information handling system node 200 being the only environmental telemetry data collector and aggregator to both the anchor information handling system node 200 and the docking station 251 acting as the environmental telemetry data collector and aggregator occurs when the KPI data and device node capabilities have indicated that the telemetry aggregation functions should be transitioned from the anchor information handling system node 200 to the docking station 251. As described herein, this aggregation process may not only include the accumulation or collection of environmental telemetry data from each peripheral device node, but also include the categorization of that telemetry data by adding metadata that describes, for example, a type of peripheral device the telemetry data has originated from, the type of telemetry data originating from that device node, current settings at that device node, potential settings at that device node, among others. It is appreciated that this data may form an environmental context in which the device nodes are operating in the peripheral device workspace. For example, a first device node may be a built-in video display device (e.g., at a laptop) and a second device node may be an external video display device. In this example, the environmental telemetry data associated with the built-in video display device may include metadata that categorizes the resolution data of the environmental telemetry data from the built-in video display device, the current display settings of the telemetry data from the built-in video display device, and so on for aggregation under display type environmental telemetry data. Similarly, the telemetry data associated with the external display device may include metadata that categorizes the resolution data of the environmental telemetry data from the external video display device, the current display settings of the environmental telemetry data from the external video display device, and so on for aggregation under display type environmental telemetry data. Additionally, as described herein, the peripheral device workspace cloud orchestrator server 258 may provide peripheral device workspace recommendations to optimize configurations of the device nodes within the peripheral device workspace based on the KPI data and context of operation of each device node within the peripheral device workspace. For example, environmental telemetry data categorized as display environmental telemetry data may be accessed to aggregate and compare display device settings for display device nodes in the peripheral device workspace.

During operation, the execution of the ecosystem manageability service module 270 may be used to help create the peripheral device workspace. For example, the anchor information handling system node 300 may enroll a new device node (e.g., a wireless mouse) with a third-party manageability platform (e.g., FIG. 3, 397) so that the cloud manageability orchestrator module 268 may access tokens sent from the third-party manageability platform. The ecosystem manageability and telemetry sub-agent 286-1 of the anchor information handling system node 200 may request that a workspace be created that includes the anchor information handling system node 200 and the new device node. As new device nodes are operatively coupled to the anchor information handling system node 200, the execution of the cloud manageability orchestrator module 268 by the cloud orchestrator hardware processing device 266 of the peripheral device workspace cloud orchestrator server 258 may update a map and manifest of the node devices within the peripheral device workspace.

With the peripheral device workspace being formed, the execution of a cloud manageability orchestrator sub-agent 296 by the hardware processing device 202 of the anchor information handling system 200 causes the anchor information handling system 200 to send device node capabilities associated with each device node in the peripheral device workspace including those peripheral devices associated with the anchor information handling system node 200 and the docking station 251. Again, these capabilities may include for example, video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. In addition to the capabilities, the execution of the cloud manageability orchestrator sub-agent 296 causes the anchor information handling system 200 to send the KPIs and other telemetry data to the peripheral device workspace cloud orchestrator server 258 as described herein. Again, the KPI data may include processing performance KPI, battery availability KPI, audio KPIs, video KPIs, and the like. The telemetry data may include any data, in situ of each of the peripheral device nodes within the created peripheral device workspace. Some specific examples of telemetry data may include, but are not limited to, Input/Output (I/O) operation load on the peripheral device nodes, memory usage the peripheral device nodes, storage usage the peripheral device nodes, CPU/hardware processor utilization, power utilization of the peripheral device nodes, wired or wireless connectivity quality, application and/or hardware uptime and downtime of the peripheral device nodes, user information, application errors and exceptions, database accesses of each of the peripheral device nodes, latency, web log information, and database errors and warnings. In an embodiment, the telemetry aggregator sub-agent 284-1 of the anchor information handling system node 200 may prepare this environmental telemetry data (including the KPI data) for aggregation prior to sending this data to the peripheral device workspace cloud orchestrator server 258 where it may be aggregated in various ways depending on execution of the one or more software modules of the peripheral device workspace cloud orchestrator 256. Again, this aggregation process may include adding metadata to the environmental telemetry data that categorizes the environmental telemetry data into categories such as the type of peripheral device the environmental telemetry data has originated from, the type of environmental telemetry data originating from that device node, current settings at that device node, potential settings at that device node, among others. It is appreciated that this data may form an environmental context in which the device nodes are operating. For example, a first device node may be a built-in video display device 244-1 (e.g., at a laptop) and a second device node may be an external video display device 244-2 (e.g., operatively coupled to the docking station 251). In this example, the environmental telemetry data associated with the built-in video display device 244-1 may include metadata that categorizes the resolution data of the environmental telemetry data from the built-in video display device 244-1, the current display settings of the environmental telemetry data from the built-in video display device 244-1, and so on as display device categorized environmental telemetry data. Similarly, the telemetry data associated with the external display device 244-2 may include metadata that categorizes the resolution data of the environmental telemetry data from the external video display device 244-2, the current display settings of the environmental telemetry data from the external video display device 244-2, and so on as display device categorized environmental telemetry data. This is just one example of types of categorized environmental telemetry data according to embodiments herein.

This environmental telemetry data, after being prepared for aggregation, may be routed through the peripheral device server notification gateway 382 and to the peripheral device workspace cloud orchestrator server 258 executing computer-readable program code of the telemetry aggregator module 276. The telemetry aggregator module 276 may aggregate the telemetry data. In an embodiment, this aggregated telemetry data may be used by the peripheral device workspace cloud orchestrator server 258, executing a telemetry ownership orchestrator module 274, to compute whether any telemetry offloading responsibilities are to take place such that at least some telemetry aggregation functions are offloaded from one device node (e.g., the anchor information handling system 200) to another device node (e.g., the docking station 251). The results of this determination may be retransmitted from the peripheral device workspace cloud orchestrator server 258 to the anchor information handling system 200 and any smart device node (e.g., docking station 251) within the peripheral device workspace. For example, hardware processing utilization levels, memory utilization levels, or network congestion levels at the anchor node information handling system node 200 or the smart device node 251 may determine whether offloading of environmental telemetry gathering and aggregation processing should occur based on threshold levels of those factors. Based on the results of the determination by the telemetry ownership orchestrator module 274 whether offloading should occur, some of the environmental telemetry gathering and aggregation preparation processing may be offloaded or not to a second smart device node in the peripheral device workspace. In an embodiment, the anchor information handling system 200 may request that a mapping of the environmental telemetry gathering be made by the execution of the telemetry ownership orchestrator module 274 which will notify the anchor information handling system 200 and smart node devices which of the device nodes report to which telemetry aggregator sub-agent 284-1, 284-2 within the peripheral device workspace as well as which peripheral device nodes within the peripheral device workspace are responsible for collecting and aggregating the environmental telemetry data (e.g., the anchor information handling system node 200 or both the anchor information handling system node 200 and the docking station 251).

It is appreciated that the KPI data and environmental context data as part of the environmental telemetry data collected for a peripheral device workspace is used by the telemetry ownership orchestrator module 274 to determine whether some of the telemetry aggregation functions and responsibilities should be offloaded from one device node such as the anchor information handling system 200 to another device node such as the docking station 251. Indeed, as the KPI data and environmental context data changes, the determination as to whether the aggregation functions should be offloaded may also change. For example, where the KPI data associated with the hardware processing device 202 of the anchor information handling system 200 indicates that a threshold hardware processing utilization limit has been reached or exceeded, this KPI data may be used in the calculations made by the telemetry ownership orchestrator module 274 to offload the telemetry aggregation data from the anchor information handling system 200 to, for example, the hardware processing device associated with the docking station 251. However, where the KPI data has indicated that the hardware processing utilization threshold limit is no longer exceeded, the calculations made by the telemetry ownership orchestrator module 274 may indicate that the telemetry aggregation responsibilities are to be offloaded back to the hardware processing device 202 of the anchor information handling system 200. This may be especially true when a hardware processing utilization threshold or other utilization threshold limit is reached at the docking station 251 in the interim.

In another example, a change in environmental context data may also be used by the telemetry ownership orchestrator module 274 to determine whether to offload the telemetry aggregation responsibilities within the peripheral device workspace. For example, where the location of the peripheral device workspace has changed such that the docking station 251 is no longer operatively coupled to the anchor information handling system 200, the environmental context data indicates this change such that offloading the telemetry aggregation responsibilities to the docking station 251 is no longer an option. However, other smart device nodes (if detected and available) within the new peripheral device workspace may be used to offload those telemetry aggregation responsibilities if determined from the environmental context data for the peripheral device workspace. Thus, the process of updating the telemetry aggregating device node within the peripheral device workspace may be a continual process based on the changing KPI data, context data, and capability data determined from the environmental telemetry data received from the peripheral device workspace.

In an embodiment, the peripheral device workspace cloud orchestrator server 258 may execute computer-readable program code of a workspace context discovery module 280 to generate mapping recommendations that describe which capabilities 290-1 through 290-17 of which of the device nodes should be used within the peripheral device workspace. These capabilities may include, for example, video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. During operation, the anchor information handling system 200 may execute computer-readable program code of the workspace context discovery sub-agent 298 to discover node devices within the peripheral device workspace as well as the individual capabilities 290-1 through 290-17 associated with those node devices. Execution of the cloud manageability orchestrator sub-agent 298 causes the workspace context discovery sub-agent 298 to send the specific capabilities 290-1 through 290-17 detected at each of the device nodes within the peripheral device workspace. The anchor information handling system 200 may also send the capabilities 290-1 through 290-17 to the workspace capability orchestrator module 278 of the peripheral device workspace cloud orchestrator server 258 for, in an example embodiment, storage on a cloud orchestrator database 288.

In an embodiment, execution of the cloud manageability orchestrator sub-agent 298 may cause the anchor information handling system 200 to request that the capabilities 290-1 through 290-17 be mapped. Additionally, the KPI data and environmental context data from gathered environmental telemetry data described herein is also sent with this request to the anchor information handling system 200. This request is sent to the peripheral device workspace cloud orchestrator server 258 executing a workspace context discovery module 280 for this mapping of the capabilities 290-1 through 290-17. As described herein, the execution of the cloud manageability orchestrator sub-agent 298 generates recommendations that map the capabilities 290-1 through 290-17 based on the context data and KPI data. For example, a peripheral device workspace may include an external webcam 294-2, an internal webcam 294-1 on the anchor information handling system node 200, a video display device 244-1, and an external video display device 244-2. Each of these device nodes may include hardware that defines their capabilities such as the external webcam 294-2 having a microphone to capture audio input, a camera to capture video input, a universal serial bus cable currently inserted into a USB port on the anchor information handling system node 200, and a wireless interface adapter that can wirelessly couple the external webcam to the anchor information handling system node 200 instead of using a wired connection. All of these capabilities 290-1 through 290-17 may be identified by the peripheral device workspace cloud orchestrator server 258 after receiving device identification data from the anchor information handling system node 200. These capabilities may be mapped by the execution of a workspace context discovery module 280 to provide recommendations, based on the capabilities 290-1 through 290-17 and a context indicated in environmental context data in which the anchor information handling system node 200 is operating, indicating which functionalities should be switched from one device to another. For example, where the external webcam 294-2 is removed from the anchor information handling system node 200 and, accordingly, from the peripheral device workspace, the execution of the workspace context discovery module 280 may provide a recommendation to switch those capabilities 290-1 through 290-17 associated with the external webcam 294-2 to the capabilities associated with the internal webcam 294-1. The mapped capabilities may then be updated and provided to the anchor information handling system node 200 and smart node devices (e.g., docking station 251 within the peripheral device workspace.

It is appreciated that, in one embodiment, the user of the anchor information handling system 200 may be notified of any offloading of the telemetry aggregation responsibilities within the peripheral device workspace and/or the switching between different capabilities 290-1 through 290-17 of one device node to another. In an embodiment, the peripheral device workspace cloud orchestrator server 258 may execute computer-readable program code of a cloud orchestrator notification module 272 to provide such notifications to the user during operation of the systems described herein.

Figure 3:
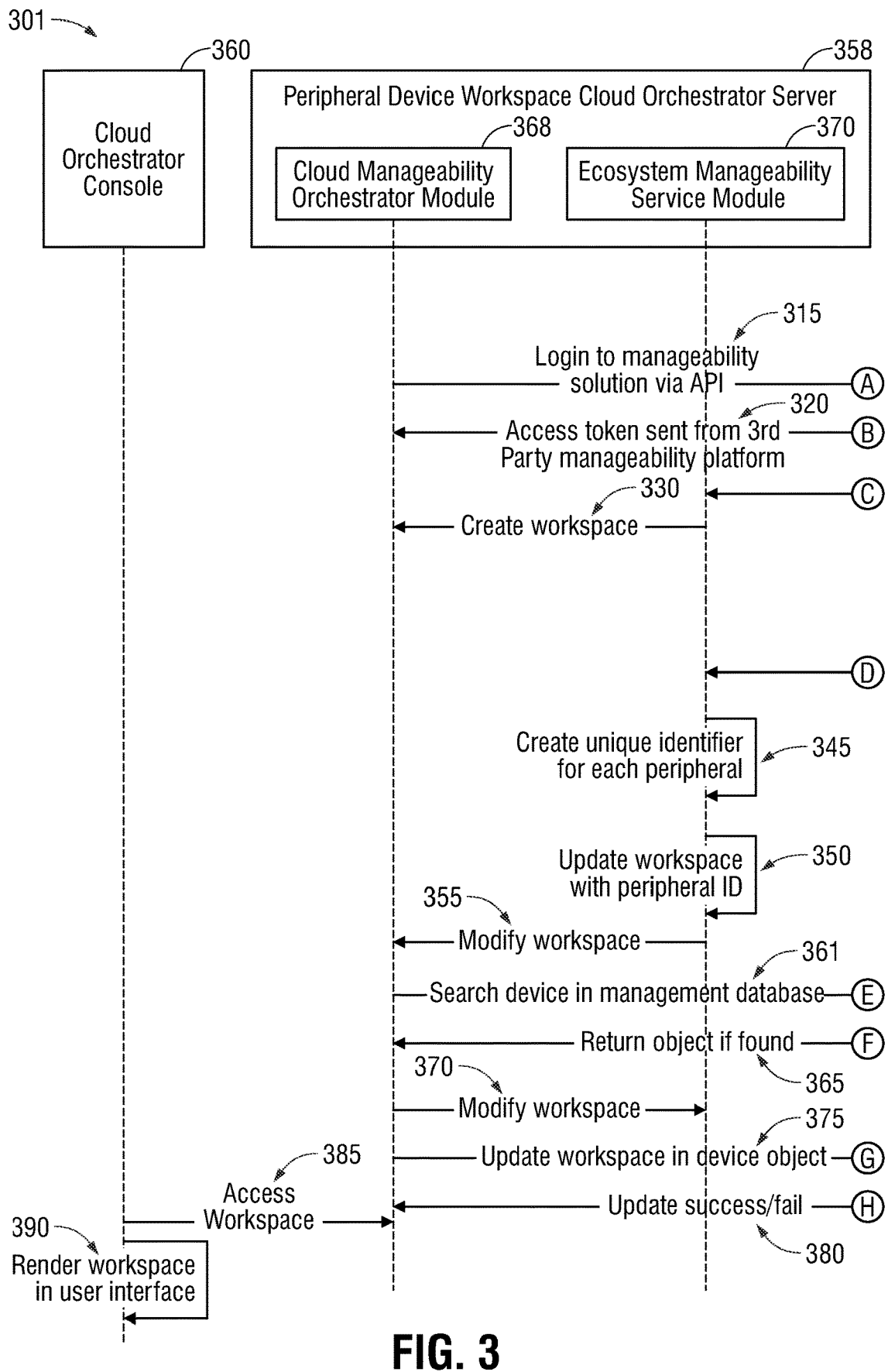
FIG. 3 is a flow chart showing a method of executing code instructions of a cloud manageability orchestrator module on a peripheral device workspace cloud orchestrator server to automatically register node devices within one or more peripheral device workspaces to manage and orchestrate those node devices according to an embodiment of the present disclosure.
Figure 3:
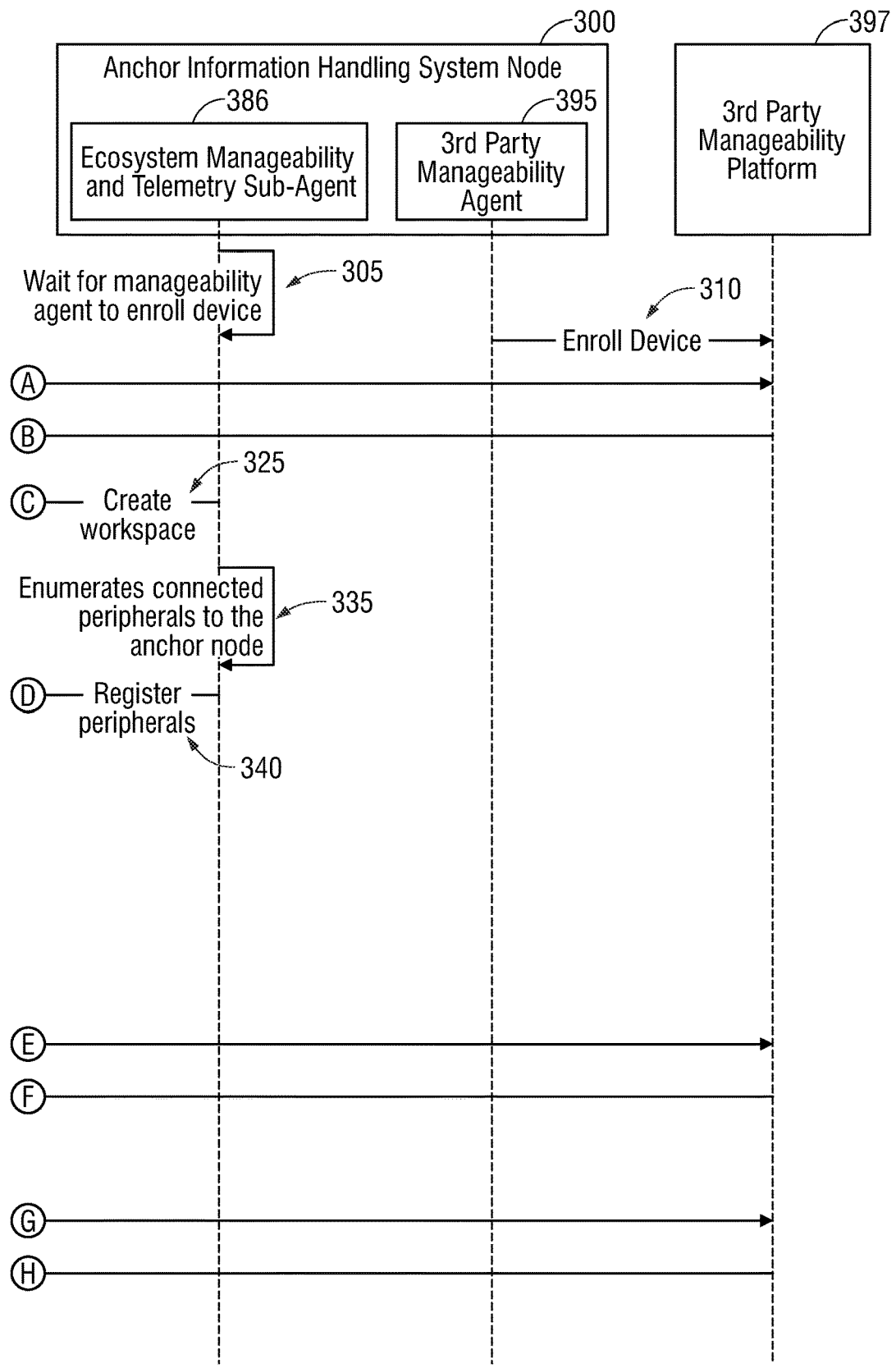

FIG. 3 is a flow chart showing a method 301 of executing code instructions of a cloud manageability orchestrator module 368 on a peripheral device workspace cloud orchestrator server 358 to automatically register node devices within one or more peripheral device workspaces to manage and orchestrate those node devices according to an embodiment of the present disclosure. FIG. 3 shows more details related to the execution of code instructions of a cloud manageability orchestrator module 368 for registering of those peripheral devices and anchor information handling system node 300 to the peripheral device workspaces having unique peripheral device workspace identification values and stored in a workspace database accessible by the cloud manageability orchestrator module 368 in order to allow an ITDM to manage those peripheral device and information handling systems associated with one or more users.

In an embodiment, at line 305, the computer-readable program code of the ecosystem manageability sub-agent 386 is executed by a hardware processing device of the information handling system 300 in order to detect when a third-party manageability agent 395 executing on the information handling system 300 has enrolled a peripheral device or information handling system. This process of detecting when the third-party manageability agent 395 enrolls peripheral devices may be continuous in an embodiment. In another embodiment, the execution of the ecosystem manageability sub-agent 386 may periodically determine if and when the third-party manageability agent 395 has enrolled any peripheral devices as operational within a peripheral device workspace at line 310.

At line 315, the cloud manageability orchestrator module 368 may log into one or more third-party manageability platforms 397 via the API for corresponding peripheral devices as described in embodiments herein. In an embodiment, the third-party manageability platform 397 and cloud manageability orchestrator module 368 may work in concert to provide to the cloud manageability orchestrator module 368 any enrollment data and peripheral device ID data associated with any enrolled peripheral devices in a peripheral device workspace.

At line 320 an access token from the one or more third-party manageability platforms 397 may be provided to the cloud manageability orchestrator module 368. This access token allows the cloud manageability orchestrator module 368 to gain access to the peripheral device data for each enrolled peripheral device and information handling system from the one or more third-party manageability platforms.

At line 325, the ecosystem manageability sub-agent 386 may create a peripheral device workspace by identifying those peripheral devices and information handling systems that are operated by a specific user, a location where those peripheral devices and information handling systems are being operated, and the association of any peripheral devices to the information handling system as collected by the ecosystem manageability sub-agent 386. Such information may be used by the cloud manageability orchestrator module 368 executing at the peripheral device workspace cloud orchestrator server 358 for determination and identification of the peripheral device workspace with a peripheral device workspace identification value stored in a peripheral device workspace manifest at a workspace database associated with the peripheral device workspace cloud orchestrator server 358. This allows the ecosystem manageability service module 370 to create a peripheral device workspace with the cloud manageability orchestrator module 368 at the peripheral device workspace cloud orchestrator server 358 based on this data at line 325.

The ecosystem manageability service module 386 may continue to identify this created peripheral device workspace at line 330 at the cloud manageability orchestrator module 368 with a unique peripheral device workspace identification value as described in embodiments herein. The execution of the computer-readable program code of the ecosystem manageability service module 386 may further associate the data for a manifest of nodes in the identified peripheral device workspaces from the ecosystem manageability sub-agent 386 by associating a service tag and peripheral device workspace identification value for each of the created peripheral device workspaces. In an embodiment, the association of a service tag and peripheral device workspace identification value to the created peripheral device workspace may be stored on a workspace database (not shown) associated with the peripheral device workspace cloud orchestrator server 358 as directed by the cloud manageability orchestrator module 368.

At line 335, the ecosystem manageability sub-agent 386 may enumerate connected peripheral devices to the anchor information handling system node 300 acting as the primary or anchor node device and associated with the user. This enumeration of the connected peripheral device nodes may include the ecosystem manageability sub-agent 386 detecting which peripheral devices are operatively coupled to the information handling system 300, how those peripheral device nodes are operatively coupled to the information handling system 300, and an peripheral device identification (ID) associated with each of the connected peripheral device nodes, among other identification data as well as a location for enumeration of peripheral devices and other nodes in a peripheral device workspace for association with a peripheral device workspace identification value. Additionally, the enumeration of the connected peripheral devices may also include assigning a user to each of the connected peripheral devices for a peripheral device workspace identification value with a composite peripheral device workspace identifier for a user such that those peripheral devices operatively coupled to the user's information handling system 300 are also tied to that user.

In an embodiment, the execution of the computer-readable program code of the ecosystem manageability sub-agent 386 may then register, at line 340, those enumerated peripheral device with the ecosystem manageability service module 370 in the peripheral device workspace associated with the particular peripheral device workspace identification value. This allows the ecosystem manageability service module 370 to determine the layout of each of the created peripheral device workspaces that forms a framework environmental context data for the peripheral device workspace and, at line 345, create unique identifiers for each of the peripheral device nodes registered with a peripheral device workspace identification value from the ecosystem manageability sub-agent 386. This unique identifier for each of the peripheral devices may be a random number, a serial number, or the like and may be included in a manifest for a peripheral device workspace identification value as well as associated with the composite peripheral device workspace identifier associated with the user. Thus, the ecosystem manageability service module 370 may be capable of specifically identifying a specific peripheral device within a specific created peripheral device workspace having a peripheral device workspace identification value and that is associated with a specific user, among potentially plural peripheral device workspaces for the user, via a composite peripheral device workspace identifier for a user.

At line 350, the computer-readable program code of the ecosystem manageability service module 370 may be executed by the hardware processor of the peripheral device workspace cloud orchestrator server 358 to update a peripheral device workspace having a peripheral device workspace identification value to include each peripheral device. As described in other example embodiments herein, certain peripheral devices may be swapped out for other peripheral devices causing the workspace to change context and environmental context data is changed. For example, a user may operatively couple a secondary or tertiary external monitor to a docking station coupled to the information handling system 600. These new external monitors may be incorporated into the existing created peripheral device workspace with a particular peripheral device workspace identification value and the ecosystem manageability service module 370 may update that workspace as these new peripheral devices are discovered by the ecosystem manageability sub-agent 386.

This allows the ecosystem manageability service module 370 to, at line 355, provide this data to the cloud manageability orchestrator module 368 so that the modification of the peripheral device workspace created by the information handling system 300 and its peripheral devices in a manifest associated with the particular peripheral device workspace identification value may be updated at a database (not shown) associated with the peripheral device workspace cloud orchestrator server 358. These created, modified, and updated peripheral device workspaces having unique peripheral device workspace identification values may be saved on this database and may be associated with each user of each information handling system 300 in a composite peripheral device workspace identifier for a user having access within the plurality of created peripheral device workspaces.

At line 361, the cloud manageability orchestrator module 368, an ITDM, or an automatic hardware device operational policy of an enterprise may search for the peripheral devices on a management database (not shown) associated with the third-party manageability platform 397 for peripheral devices associated with that third-party that are part of created or updated peripheral device workspace with a peripheral device workspace identification value. This management database may include specific details about the enrolled peripheral devices at line 305 and 310 as well as general information about the capabilities of the type of peripheral devices enrolled and potential settings associated with each of the enrolled peripheral devices. The third-party manageability platform 397 may return this device-specific and general data to the cloud manageability orchestrator module 368 at line 365 if found. For example, a user may have been associated with a specific peripheral device workspace in a composite peripheral device workspace identifier for the user identifying that peripheral device workspace identification value, such as a home office peripheral device workspace, the peripheral device workspace identification value may be stored with a peripheral device workspace manifest that includes an information handling system 300 acting as the primary or anchor node device with a plurality of peripheral devices operatively coupled to the information handling system 300 associated with that user. It may arise that an ITDM may order a new peripheral device for the user such as a wireless mouse with the new wireless mouse being operatively coupled to the information handling system at the peripheral device workspace of the particular peripheral device workspace identification value, such as of the home office peripheral device workspace. In this example, the old mouse associated with the user's information handling system and indicated as being part of the created workspace may be removed from the particular peripheral device workspace, such as from the manifest of nodes of the peripheral device workspace identification value for the home office peripheral device workspace. As such, the cloud manageability orchestrator module 368 may modify the environmental context data for the created peripheral device workspace for the peripheral device workspace identification value of the home office peripheral device workspace to not include the old mouse and replace it with the new wireless mouse that has the device-specific and general data associated with it. The ecosystem manageability service module 370 executed on the peripheral device workspace cloud orchestrator server 358 may record this modification of the peripheral device workspace manifest associated with the peripheral device workspace identification value for the home office peripheral device workspace to indicate the new wireless mouse and its device-specific and general data as being part of the home office peripheral device workspace and the old mouse is no longer to be included in the home office peripheral device workspace.

At line 375, the cloud manageability orchestrator module 368 may update the workspace based on the device-specific and general data added and indicated as being associated with each of the new peripheral devices in the workspace. The device object is updated at the management database of the third-party manageability platform 397 for the peripheral device identification so that any updates or functional modifications may be retrieved from the third-party manageability platform 397 for that peripheral device if such should occur and managed and controlled by the execution of the cloud manageability orchestrator module 368 at the peripheral device workspace cloud orchestrator server 358. At line 380, the third-party manageability platform 397 may indicate whether the update of the workspace at the management database was successful or not to the cloud manageability orchestrator module 368 executing at the peripheral device workspace cloud orchestrator server 358.

It is appreciated as well that the ITDM may be able to access this created and modified peripheral device workspace by using the peripheral device workspace cloud orchestrator console 360 to access the peripheral device workspace from the cloud manageability orchestrator module 368 at line 385. In an embodiment, the created and modified peripheral device workspace, such as the home office peripheral device workspace, is rendered with a manifest of peripheral device nodes identified, capabilities, connectivity options, and operational or update status as well as other peripheral device or node data on a graphical user interface (GUI) presented to the ITDM at a video display device of the peripheral device workspace cloud orchestrator console as described herein. Again, the ITDM may determine a number of potential issues associated with the modification of the workspace including, but not limited to, whether the new wireless mouse is compliant or not with current hardware device operational policies provided by the ITSM at the third-party manageability platform 397, whether proper firmware/software updates have been received at or propagated to the newly added wireless mouse, and whether the wireless mouse is also forming or should be part of a different workspace such as a hybrid work office peripheral device workspace. As such, the ITDM, via execution of the cloud manageability orchestrator module 368 on the peripheral device workspace cloud orchestrator server 358, can access this data for any of a plurality of peripheral device workspaces in order to create and orchestrate one or more peripheral device workspaces.

Figure 4:
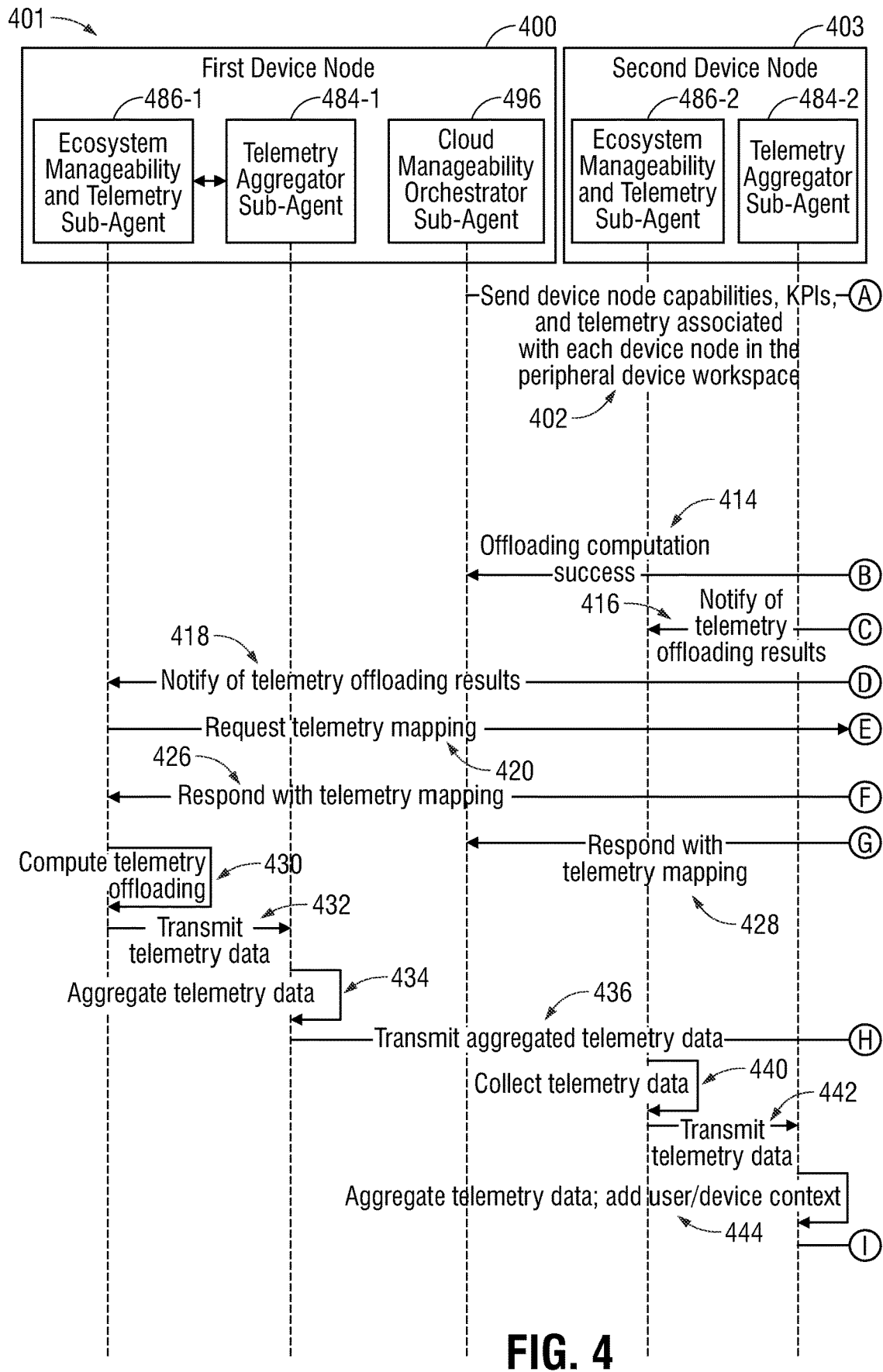
FIG. 4 is a flow chart showing a system and method of computing telemetry offloading within a peripheral device workspace according to an embodiment of the present disclosure according to an embodiment of the present disclosure.
Figure 4:
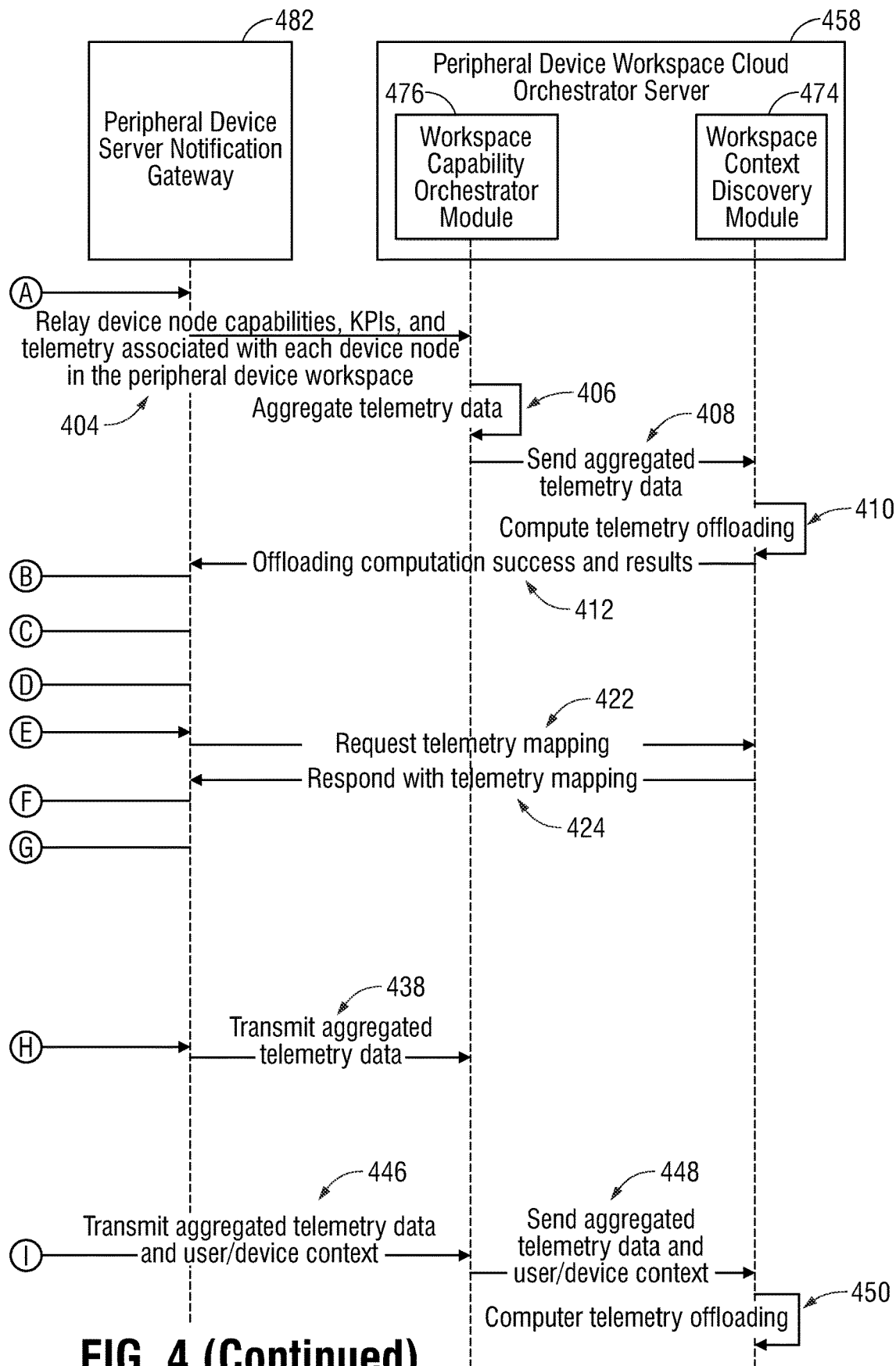

FIG. 4 is a flow chart showing a method 401 of computing telemetry offloading within a peripheral device workspace according to an embodiment of the present disclosure according to an embodiment of the present disclosure. As described herein, by offloading some portion of the telemetry aggregation responsibilities from a first device node 400 (e.g., anchor information handling system) to a second device node 403 (e.g., a smart device node such as a docking station) increases the quality of experience (QoE) of the peripheral device workspace for users by seamlessly and automatically reducing processing loads on a hardware processing devices within the anchor information handling system when changes in device capabilities, KPIs, and environmental context data changes as indicated by gathered environmental telemetry data from the peripheral device workspace.

At line 402 execution of the cloud manageability orchestrator-sub-agent 496 may periodically send device node capabilities, KPIs, and environmental context data in environmental telemetry data collected for and associated with each of the device nodes in the peripheral device workspace. This environmental telemetry data may be collected and aggregated, at least initially, by a telemetry aggregator sub-agent 484-1 as described herein. This environmental telemetry data may include, for example, any data, in situ of each of the peripheral device nodes. Some specific examples of environmental context data in the environmental telemetry data may include, but are not limited to, Input/Output (I/O) operation load on the peripheral device nodes, memory usage the peripheral device nodes, storage usage the peripheral device nodes, CPU/hardware processor power utilization of the peripheral device nodes, connectivity of node devices, connectivity quality, application and/or hardware uptime and downtime of the peripheral device nodes, user information, application errors and exceptions, database accesses of each of the peripheral device nodes, latency, web log information, and database errors and warnings. The KPIs may be a category of environmental telemetry data that include general performance KPIs, battery availability KPIs, application KPIs, audio KPIs, video KPIs, threshold battery power level KPIs, threshold temperature level KPIs, and threshold processing resource level KPIs among other KPIs. Device capabilities data in the environmental telemetry data may describe video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. This capability data, KPI data, and environmental context data in collected environmental telemetry data may be processed for aggregation, at least initially, by the first device node 400 and transmitted to peripheral device workspace cloud orchestrator server 458 by way of a peripheral device server notification gateway 482 which, at line 404 relays the capability data, KPI data, and environmental context data in the environmental telemetry data to the peripheral device workspace cloud orchestrator server 458. As described herein, this aggregation process may include adding metadata to the telemetry data that categorizes the environmental telemetry data into categories such as the type of peripheral device the environmental telemetry data has originated from, the type of environmental telemetry data originating from that device node, current settings at that device node, potential settings at that device node, among others. It is appreciated that this data may form a context in which the device nodes are operating in a peripheral device workspace. For example, a first device node may be a built-in video display device (e.g., at a laptop) and a second device node may be an external video display device. In this example, the environmental telemetry data associated with the built-in video display device may include metadata that categorizes the resolution data of the telemetry data from the built-in video display device, the current display settings of the telemetry data from the built-in video display device, and so on that is in a display device category for collected environmental telemetry data. Similarly, the telemetry data associated with the external display device may include metadata that categorizes the resolution data of the environmental telemetry data from the external video display device, the current display settings of the environmental telemetry data from the external video display device, and so on that is also in a display device category for collected environmental telemetry data from the peripheral device workspace. This is just one example of a display device category for collected environmental telemetry data by which the environmental telemetry data may be aggregated ultimately at the peripheral device workspace cloud orchestrator server 458.

The peripheral device workspace cloud orchestrator server 458 executes computer-readable program code of a telemetry aggregator module 476 to, at line 406, aggregate the capability data, KPI data, and environmental context data in the environmental telemetry data whether they come from two different device node communication links in the peripheral device workspace or aggregated based on one or more other categories of environmental telemetry data. In an embodiment, the execution of the telemetry aggregator module 476 may also store the capability data, KPI data, and environmental context data in the environmental telemetry data on a cloud orchestrator database and may associate the capability data, KPI data, and environmental context data in the environmental telemetry data with a user identification, peripheral device workspace identification, and device node identification as well as any other categorization applied.

At line 408, the aggregated capability data, KPI data, and environmental context data in the environmental telemetry data is provided and used by the peripheral device workspace cloud orchestrator server 458 executing computer-readable program code instructions of a telemetry ownership orchestrator module 474. By executing the telemetry ownership orchestrator module 474, the peripheral device workspace cloud orchestrator server 458 determines the telemetry aggregation offloading at line 410. The peripheral device workspace cloud orchestrator server 458 determines whether, based on the capability data, KPI data, and environmental context data in the environmental telemetry data, some of the environmental telemetry collection and aggregation processing should be offloaded from the first device node 400 to the second device node 403 within the peripheral device workspace. The transitioning of some of these environmental telemetry collection and aggregation responsibilities from the first device node 400 to the second device node 403 may generally depend on the current status of hardware processing resources, memory resources, network connectivity usage levels or other usage levels of resources of the first device node 400. For example, execution of code instructions of a telemetry ownership orchestrator module 474 may determine from the capability data the available processing resources available at the first device node 400, a current load on the hardware processing device on the first device node 400 as well as current operation context within the peripheral device workspace such as whether processing-intensive applications are being executed by the hardware processing device within the first device node 400 reaching a hardware processing threshold level of usage.

Further, execution of code instructions of a telemetry ownership orchestrator module 474 may determine that the capability data indicates the hardware processing capacity on other device nodes within the peripheral device workspace including the second device node 403 (e.g., smart device node) have greater availability and are not reaching a usage threshold level. For example, where the first device node 400 is initially responsible for aggregating the capability data, KPI data, and environmental context data in the environmental telemetry data for all the device nodes within the peripheral device workspace and the first device node 400 is executing a gaming application that requires a significant amount of hardware processing resources, this capability data, KPI data, and environmental telemetry data is used by the telemetry ownership orchestrator module 474 to determine whether some of the environmental telemetry collection and aggregation processing responsibilities should be offloaded.

At lines 412, 414, the success of the offloading determination from the execution of the code instructions of the telemetry ownership orchestrator module 474 may be sent to the cloud manageability orchestrator-sub-agent 496 via the peripheral device server notification gateway 482. At lines 416 and 418, the ecosystem manageability and telemetry sub-agent 486-1 of the first device node 400 and the ecosystem manageability and telemetry sub-agent 486-2 of the second device node 403 are notified regarding the results of the determination of the telemetry offloading at line 410. This transmission instructs the first device node 400 and the second device node 403 concurrently about which of these device nodes is now responsible for telemetry collection and aggregation processing of environmental telemetry data from assigned or "owned" peripheral device nodes within the peripheral device workspace. It is appreciated that these environmental telemetry data collection and aggregation processing functions performed by any of the ecosystem manageability and telemetry sub-agents 486-1, 486-2 may be preparation for those functions associated with the operation of the telemetry aggregator module 476 at the peripheral device workspace cloud orchestrator server 458 to ultimately aggregate the collected environmental telemetry data whether from one or multiple device nodes in a peripheral device workspace. Again, these aggregation processes include in some embodiments, adding metadata to the telemetry data that categorizes the telemetry data into categories such as the peripheral device workspace providing the environmental telemetry data, the type of peripheral device the environmental telemetry data has originated from, the type of environmental telemetry data originating from that device node, current settings at that device node, potential settings at that device node, among others. It is appreciated that this data may form a context in which the device nodes are operating within the peripheral device workspace.

In an example, where the determination of offloading at line 410 by the execution of the code instructions of the telemetry ownership orchestrator module 474 has indicated that the telemetry aggregation responsibilities are to be transitioned from the first device node 400 to the second device node 403, the hardware processing device of the first device node 400 may discontinue the execution of the telemetry aggregator sub-agent 484-1 and stop collecting and aggregating the capability data, KPI data, and environmental context data in the environmental telemetry data on behalf of a subset of device nodes within the peripheral device workspace that have been offloaded to the alternative smart device node. Concurrently, the second device node 403 is instructed to execute the ecosystem manageability and telemetry sub-agent 486-2 and a corresponding telemetry aggregator sub-agent to gather and process for aggregation the capability data, KPI data, and environmental context data in the environmental telemetry data from each device node that has been offloaded to the second device node 403 within the peripheral device workspace.

At lines 420 and 422, the ecosystem manageability and telemetry sub-agent 486-1 executing on the first device node 400 may periodically request for telemetry mapping via the peripheral device server notification gateway 482. This request may be made to determine which device nodes within the peripheral device workspace the ecosystem manageability and telemetry sub-agent 486-1 is owned by which of the anchor information handling system node or the smart peripheral device node to collect and process for aggregation the capability data, KPI data, and environmental context data in the environmental telemetry data for aggregation at the peripheral device workspace cloud orchestrator server 458 depending on offloading determined at line 410. Upon offloading of some portion of the node devices, the first device node 400 is no longer responsible for collecting or aggregating the capability data, KPI data, and environmental context data in the environmental telemetry data for those identified node devices owned, or operatively coupled as nodes secondary to the second device node 402 (e.g., a smart device node). The first device node 400 may be provided, by this request, with the identification of the device nodes the first device node 400 is still required to collect and process for aggregation this capability data, KPI data, and telemetry data for. The response via the peripheral device server notification gateway 482 at lines 424 and 426 provides this device node identification or identifications for which the first device node 400 is to collect and process for aggregation the capability data, KPI data, and environmental context data in the environmental telemetry data. At line 428, the ecosystem manageability and telemetry sub-agent 486-2 of the second device node 403 is also notified of the telemetry mapping for the portion of node devices it is now instructed to collect and process for aggregation the capability data, KPI data, and environmental context data in the environmental telemetry data.

At line 430 and 432 the ecosystem manageability and telemetry sub-agent 486-1 of the first device node 400 may collect the capability data, KPI data, and environmental context data in the environmental telemetry data at its respective assigned device nodes and send it to the telemetry aggregator sub-agent 484-1. Continuing with the example presented herein in FIG. 2, for example, the hardware processing device of the first device node 400 (e.g., anchor information handling system node) may execute the computer-readable program code of the ecosystem manageability and telemetry sub-agent 486-1 to collect the telemetry data associated with those peripheral device nodes that are assigned to it or owned by it. For example, those peripheral device nodes that are operatively coupled directly to the anchor information handling system node 400 (e.g., the mouse, the wireless headset, the stylus, the trackpad, and the video display device) may not be accessible by an alternative smart node device and, thus, is owned by the first device node 400 (e.g., anchor information handling system node).

Execution of code instructions of the telemetry aggregator sub-agent 484-1 may operate to process the collected environmental telemetry data for aggregation at line 434 according to embodiments described herein for those node devices owned by the first device node 400 (e.g., anchor information handling system node). Because of the operations of the telemetry ownership orchestrator module 474, some of the telemetry collection and aggregation responsibilities are offloaded to the second device node 403 while others remain with the first node device 400. At line 434, the telemetry data may be processed for aggregation by the execution of the computer-readable program code of the telemetry aggregator sub-agent 484-1 and sent, at lines 436 and 438, to the telemetry aggregator module 474 at the peripheral device workspace cloud orchestrator server 458 via the peripheral device notification gateway 482.

As described herein, some of the telemetry data collection and aggregation is offloaded to the second device node 403 pursuant to the determination of offloading made at line 410. As such, the second device node 403 (e.g., docking station 251, FIG. 2) may execute code instructions of the ecosystem manageability and telemetry sub-agent 486-2 to collect the environmental telemetry data at line 440, send it to the telemetry aggregator sub-agent 484-2 at line 442. It is appreciated that this collection of environmental telemetry data is from those device nodes assigned to and owned by the second device node 403 by the offloading determination at line 410. For example, those device nodes that are directly and operatively coupled to the second device node 403 (e.g., keyboard 246, external video display device 244-2, conference room video display device 244-3, and external webcam 294-2, FIG. 2) may thus be accessed and owned by the second device node 403 for collection of environmental telemetry data from those node devices. Thus, although the first device node 400 may no longer be responsible for aggregating all of the capability data, KPI data, and environmental context data in the environmental telemetry data, the second device node 403 is responsible for collecting that capability data, KPI data, and telemetry data. Then, at line 444, the collected environmental telemetry data by the second node device 403 is processed for aggregation by execution of code instructions of the telemetry aggregator sub-agent 484-4. This is done in accordance with embodiments herein to label the collected environmental telemetry for the peripheral device workspace and other categories. This aggregation processed environmental telemetry data is then also transmitted, at line 446, to the telemetry aggregator module 476 via the peripheral device server notification gateway 482. Execution of code instructions of the telemetry aggregator module 476 at the peripheral device workspace cloud orchestrator server 458 then may aggregate with the collected environmental telemetry data from lines 436, 438 and line 446 for the peripheral device workspace. This data may then be forwarded to the telemetry ownership orchestrator module 474 at line 448 as described herein to determine if any changes in the environmental telemetry data may apply to change the offloading status again.

At line 450, execution of the code instructions for the telemetry ownership orchestrator module 474 at the peripheral device workspace cloud orchestrator server 458 may again monitor for changes in resource utilization for hardware processing, memory resources, network connectivity levels or the like to again determine if any adjustment to the offloading of responsibilities for collection and aggregation processing of the environmental telemetry data among the device nodes in the peripheral device workspace is triggered as described in embodiments herein. For example, the execution of code instructions of the telemetry ownership orchestrator module 474 at the peripheral device workspace cloud orchestrator server 458 may determine from received KPI data that a change in resource utilization, such as hardware processing resource utilization, memory resource utilization, or network connectivity resource utilization at first device node 400 (e.g., the anchor information handling system node) has changed to fall below a second utilization threshold that may be same as the first utilization threshold used at line 410 or may be different lower resource utilization threshold level used to reset or re-adjust the offloading by the telemetry ownership orchestrator module 474 at the peripheral device workspace cloud orchestrator server 458 in various embodiments.

It is appreciated that, regardless of which device node is executing the processes at lines 430/434 and 440/444 among the device nodes in the peripheral device workspace, the current capability data, KPI data, and environmental context data in the environmental telemetry data is periodically transmitted to the peripheral device workspace cloud orchestrator server 458, via the peripheral device server notification gateway 482, for the telemetry aggregator module 476 to aggregate and store this data as described herein. This method 401 allows for the periodic offloading of capability data, KPI data, and telemetry data aggregation responsibilities from one device node to another device node within the peripheral device workspace thereby staggering this responsibility when hardware processing resources at any given smart device node (e.g., anchor information handling system node and smart device node).

Figure 5:
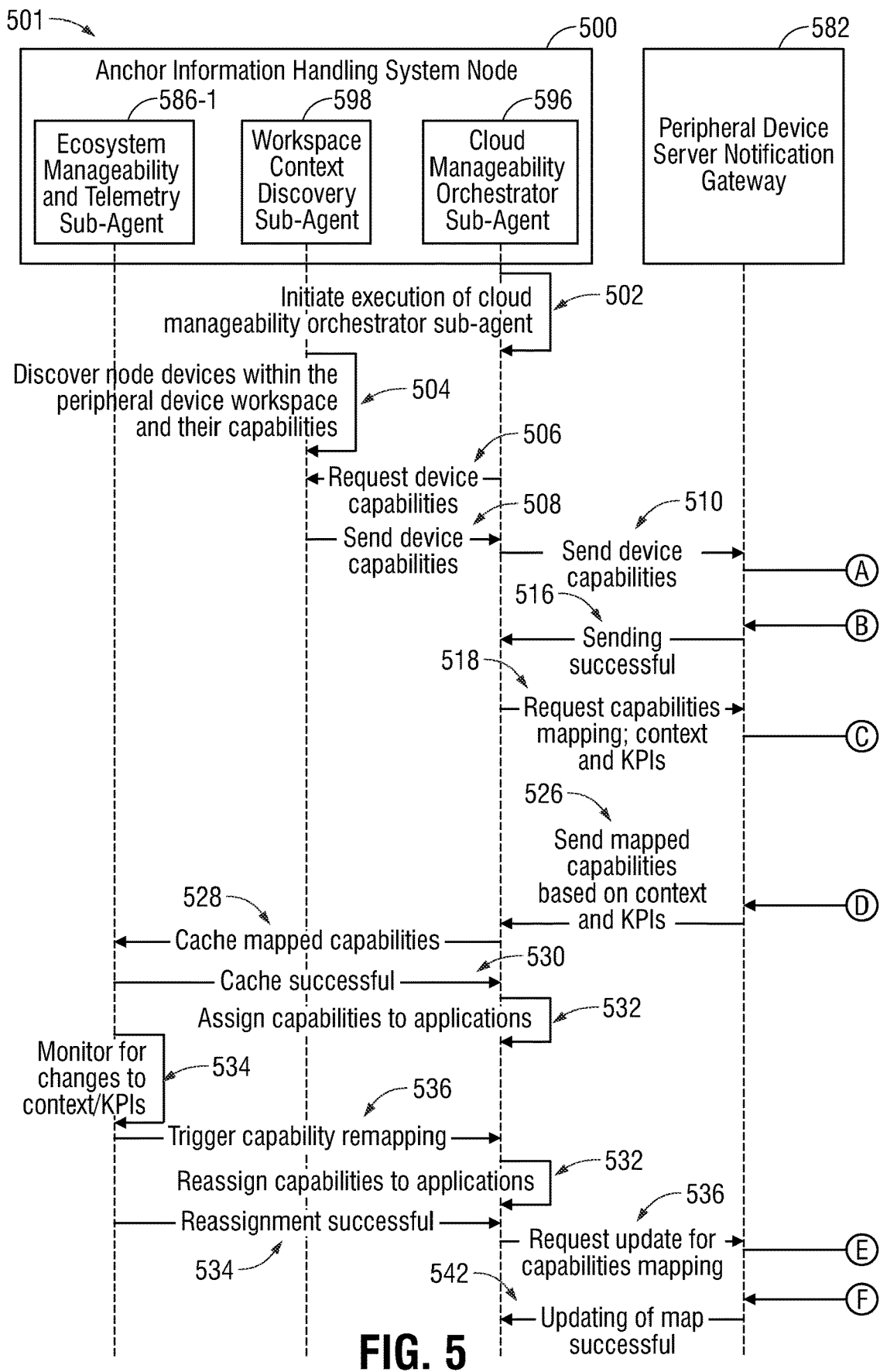
FIG. 5 is a flow chart showing a system and method of generating capability mapping recommendations within a peripheral device workspace according to an embodiment of the present disclosure.
Figure 5:
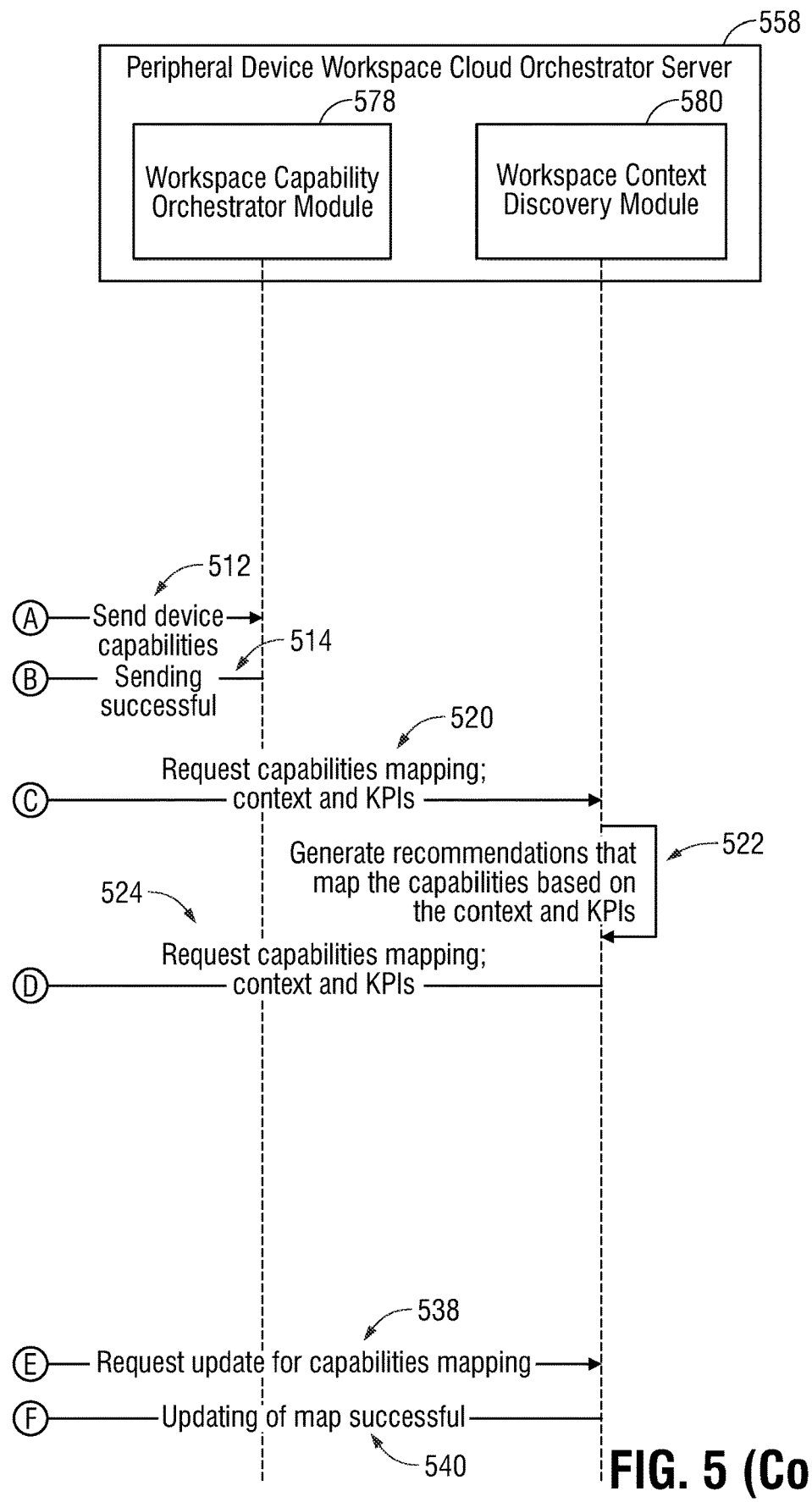

FIG. 5 is a flow chart showing a method 501 of generating capability mapping recommendations within a peripheral device workspace according to an embodiment of the present disclosure. The systems and methods described herein allow for the management of capabilities within a peripheral device workspace where redundant capabilities exist. By mapping these capabilities and generating recommendations of which node device is to be responsible for certain capabilities within the peripheral device workspace the QoE is increased resulting in higher user satisfaction.

The method 501 may include, at line 502, the anchor information handling system node 500 executing computer-readable program code of the cloud manageability orchestrator sub-agent 596. The execution of the cloud manageability orchestrator sub-agent 596 by the hardware processing device of the anchor information handling system node 500 may, in an embodiment, provide device enrollment data that describes the individual device nodes within the peripheral device workspace as detected by the anchor information handling system node 500. This enrollment data may be associated with a device ID that may describe the make, model, type, and device serial number of each device node. In an embodiment, this data may be sent to the peripheral device workspace cloud orchestrator server 558 so that the peripheral device workspace may be created as described in connection with FIG. 3.

At line 504, the execution of the workspace context discovery sub-agent 598 by the hardware processing device of the anchor information handling system node 500 may cause the anchor information handling system node 500 to discover these node devices operatively coupled to the anchor information handling system node 500 in a location and that form the peripheral device workspace. During this discovery process, the anchor information handling system node 500 may collect and identify capabilities data from gathered environmental telemetry data associated with each of the device nodes. Environmental telemetry data, including capabilities data, may be gathered by execution of code instructions for the ecosystem manageability and telemetry sub-agent 586-1 at the anchor information handling system node 500 according to embodiments herein. Again, capabilities data may include video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. These capabilities for the device nodes collected by the anchor information handling system node may be associated with the device ID for each peripheral device in an orchestrated device descriptor (ODD) by execution of code instructions of the workspace context discovery sub-agent. It is appreciated that any number of device nodes may have capabilities similar to other device nodes such that one capability of a device node may be selected over the same capability of another device node during execution of the code instructions of the workspace capability orchestrator module 578 at the peripheral device workspace cloud orchestrator server 558 according to the method 501 described herein.

At line 506, the cloud manageability orchestrator sub-agent 596 requests the capability data, such as the ODD for discovered node devices within the peripheral device workspace from the workspace context discovery sub-agent 598 and receives that data at line 508. Once the cloud manageability orchestrator sub-agent 596 has received the capability data defining the capabilities of each device node within the peripheral device workspace, the cloud manageability orchestrator sub-agent 596 sends the device capability data to the peripheral device workspace cloud orchestrator server 558 via a peripheral device server notification gateway 582 at lines 510 and 512. This may include the location and manifest of device nodes in the peripheral device workspace as well as the ODD including capabilities for each node device in the peripheral device workspace. A notification of the delivery success of the capability data and ODD to the peripheral device workspace cloud orchestrator server 558 is also provided, via the peripheral device server notification gateway 582, to the anchor information handling system node 500 at lines 514 and 516.

At line 518, the execution of the computer-readable program code of the cloud manageability orchestrator sub-agent 596 causes the anchor information handling system node 500 to request that capabilities associated with each device node be mapped. Along with this request, the anchor information handling system node 500 may send environmental context data and KPI data from environmental telemetry data collected by the ecosystem manageability and telemetry sub-agent 568-1 to the peripheral device workspace cloud orchestrator server 558 via the peripheral device server notification gateway 582. As described herein, the KPI data may be a category of environmental telemetry data that includes general performance KPIs, battery availability KPIs, application KPIs, audio KPIs, video KPIs, threshold battery power level KPIs, threshold temperature level KPIs, and threshold processing resource level KPIs among other KPIs. Additionally, environmental context data may include any environmental telemetry data that describes the operating environment of the peripheral device workspace such as physical location, device node enrollment data, current computer-readable program code being executed by the hardware processing device of the anchor information handling system node 500 (e.g., gaming applications, videoconferencing applications, etc.), activities engaged in by the anchor information handling system node 500, among other operational contexts.

At line 522, the hardware processing device of the peripheral device workspace cloud orchestrator server 558 executes computer-readable program code instructions of a workspace context discover module 580. The execution of the code instructions the workspace context discover module 580 causes the peripheral device workspace cloud orchestrator server 558 to generate mapping recommendations that describe which capabilities of which of the device nodes should be used by the anchor information handling system node within the peripheral device workspace. Again, the recommendations for mapped capabilities may depend on the operational context of the anchor information handling system node 500 as well as the KPI data received from the anchor information handling system node 500. For example, where the context data indicates that the user is currently executing a gaming application and is using a wireless headset to communicate with other users online, the context data may indicate that the best option for audio input is not a microphone of an internal webcam on the anchor information handling system node 500 but instead is the microphone present on the wireless headset. Control over capabilities, such as overlapping capabilities, among plural peripheral device nodes is recommended for execution by the anchor information handling system node 500 at the peripheral device workspace. As such, the mapping recommendation may indicate that the microphone for the internal webcam is to be muted or otherwise disabled while the microphone for the wireless headset is mapped as the primary audio input sensor to be used within the peripheral device workspace. The opposite may be mapped by the peripheral device workspace cloud orchestrator server 558 where the context indicates that a videoconferencing application is being executed on the anchor information handling system node 500 and the internal webcam is being used to provide video input during the videoconferencing session. In this example, the microphone for the wireless headset is to be muted while the microphone associated with the internal webcam is to be mapped as being the primary audio input device within the peripheral device workspace. This context may again change where, during the videoconferencing session, the wireless headset detects that the user has placed the wireless headset on the user's head. At this point, because the context has changed by the user wearing the wireless headset, the recommendation for mapping the capabilities of the device nodes may be provided such that the microphone associated with the internal webcam is not muted or otherwise disabled and the microphone of the wireless headset is now to be used as the primary audio input device within the peripheral device workspace. It is appreciated that detected KPIs may also be used during this mapping process such that processing performance KPIs, battery availability KPIs, audio KPIs, video KPIs, and the like are used to determine whether certain device nodes are capable of performing the functions required by the user in specific operational environmental context data in various operating contexts of the anchor information handling system node 500.

Having generated the mapping recommendations at line 522, the peripheral device workspace cloud orchestrator server 558 may send the mapped capabilities, based on the current environmental context data and KPI data, to the anchor information handling system node 500 via the peripheral device server notification gateway 582 at lines 524 and 526. In an embodiment, the execution of the cloud manageability orchestrator sub-agent 596 may cause these mapped capabilities to be cached or otherwise stored on the anchor information handling system node 500 in a data storage device of the anchor information handling system node 500 at line 528 with a successful caching response being received at line 530.

At line 532, the method 501 includes the anchor information handling system node 500 executing computer-readable program code of the ecosystem manageability and telemetry sub-agent 586-1 to assign the capabilities to be used by the anchor information handling system node 500 from particular device nodes in the peripheral device workspace based on the recommendations received from the peripheral device workspace cloud orchestrator server 558. Again, this may cause the anchor information handling system node 500 to assign audio input responsibility to a specific microphone of a specific device node while disabling all other microphones associated with all other device nodes within the peripheral device workspace. This process may be carried out for each detected capability and for each device node within the peripheral device workspace.

At line 534, execution of the computer-readable program code of the ecosystem manageability and telemetry sub-agent 586-1 causes the anchor information handling system node 500 to collect the environmental telemetry data from the discovered device nodes in the peripheral device workspace and monitor for changes in environmental context data and KPIs within the peripheral device workspace. For example, a change in environmental context data may include the user exiting a gaming application or executing a videoconferencing application at the hardware processing device of the anchor information handling system node 500. Example changes in KPIs may include battery depletion of a rechargeable battery within a wireless peripheral device currently being used by the user to engage with the anchor information handling system node 500. The present specification that multiple other types of changes to the operational environmental context data and KPIs associated with the operation of the anchor information handling system node 500 may be monitored by the anchor information handling system node 500 via execution of the ecosystem manageability and telemetry sub-agent 586-1.

At line 536, any changes to the operational environmental context data and/or KPIs of the anchor information handling system node 500 may trigger remapping of the capabilities within the peripheral device workspace. During this time and in order to maintain a QoE, operational contexts and KPIs that change the QoE may cause the cloud manageability orchestrator sub-agent 596 to reassign capabilities by, for example, reenabling certain capabilities at certain device nodes while disabling certain capabilities at other device nodes. This reassignment may be temporary such that after the cloud manageability orchestrator sub-agent 596 receives a notification that the reassignment was successful at line 534, the cloud manageability orchestrator sub-agent 596 again requests that that capabilities associated with each device node be mapped based on the detected changes to the operational context data and KPIs. This request at line 536 and 538 is relayed through the peripheral device server notification gateway 582 to the workspace context discover module 580 for the workspace context discover module 580 to update the mapping and return a notification at lines 540 and 542 that the remapping was successful.

Figure 6:
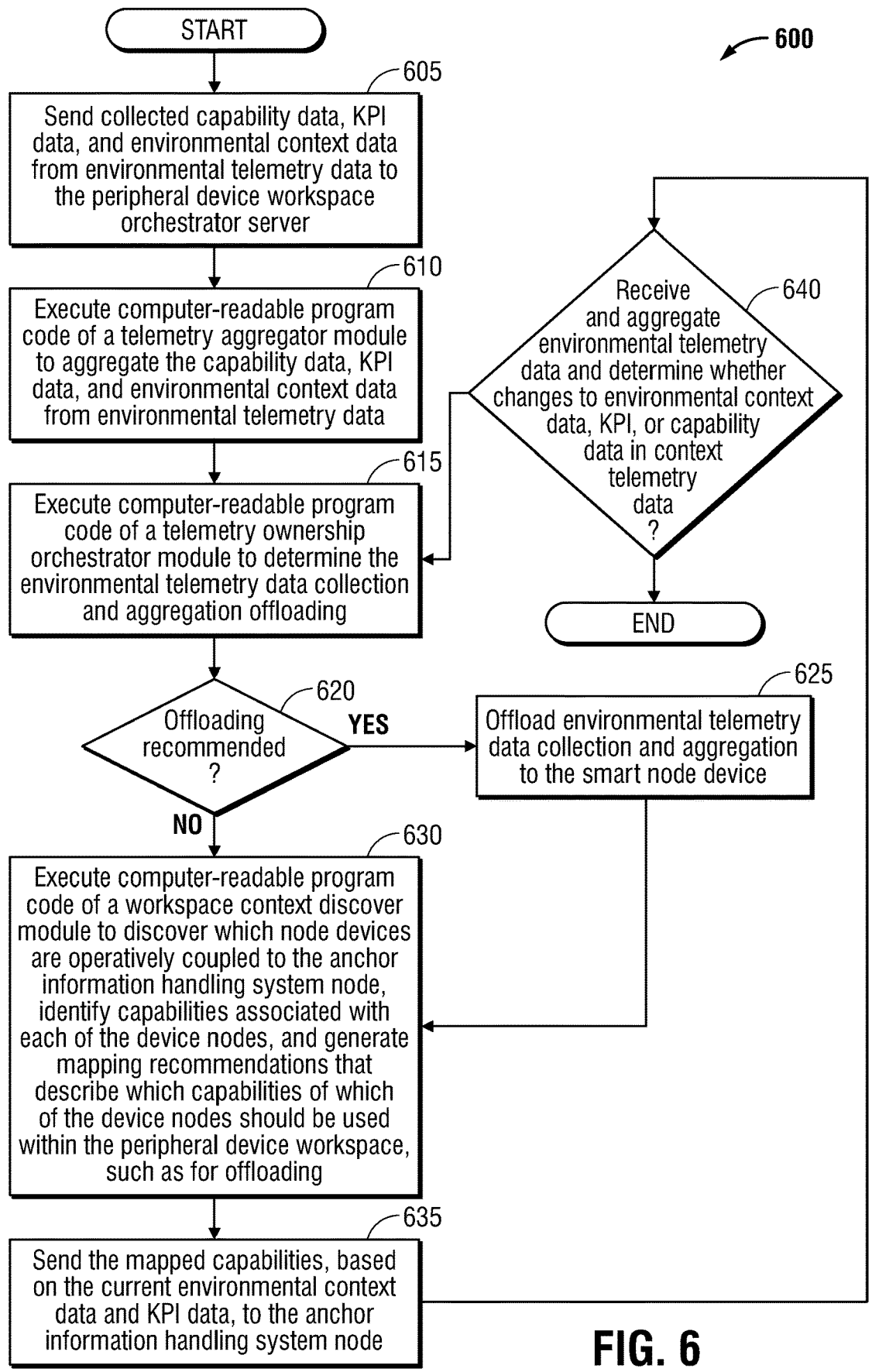
FIG. 6 is a flow chart showing method of staggering telemetry for node capabilities management across device nodes in a peripheral device workspace according to an embodiment of the present disclosure.

FIG. 6 is a flow chart showing method 600 of staggering telemetry for node capabilities management across device nodes in a peripheral device workspace according to an embodiment of the present disclosure. The method 600 described in FIG. 6 may allow for the capability data, KPI data, and environmental context data from environmental telemetry data gathered and prepared for aggregation by the most appropriate device node within the peripheral device workspace and proper assignment of device capabilities to the appropriate device node based on current and detected changes to the operational context data and KPI data for the anchor information handling system node or other smart device node gathering the environmental telemetry data from other device nodes in the peripheral device workspace.

At block 605, the method 600 may include sending the capability data, KPI data, and environmental context data in the environmental telemetry data gathered from device nodes at the peripheral device workspace to the peripheral device workspace cloud orchestrator server. This environmental telemetry data may include, for example, any data, in situ of each of the peripheral device nodes. Some specific examples of environmental context data in the environmental telemetry data may include, but are not limited to, Input/Output (I/O) operation load on the peripheral device nodes, memory usage the peripheral device nodes, storage usage the peripheral device nodes, CPU/hardware processor power utilization of the peripheral device nodes, connectivity of the device nodes, connectivity quality, application and/or hardware uptime and downtime of the peripheral device nodes, user information, application errors and exceptions, database accesses of each of the peripheral device nodes, latency, web log information, and database errors and warnings. The KPIs in the environmental telemetry data may be a category of environmental telemetry data that include general performance KPIs, battery availability KPIs, application KPIs, audio KPIs, video KPIs, threshold battery power level KPIs, threshold temperature level KPIs, and threshold processing resource level KPIs among other KPIs. Device capabilities data in the environmental telemetry data describe video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. This capability data, KPI data, and environmental context data in the environmental telemetry data telemetry data may be prepared for aggregation, at least initially, by the anchor information handling system node and transmitted to peripheral device workspace cloud orchestrator server by way of a peripheral device server notification gateway which relays the capability data, KPI data, and environmental context data in the environmental telemetry data to the peripheral device workspace cloud orchestrator server.

At block 610, the peripheral device workspace cloud orchestrator server executes computer-readable program code of a telemetry aggregator module to aggregate the capability data, KPI data, and environmental context data in the environmental telemetry data. In an embodiment, the execution of the telemetry aggregator module may also store the capability data, KPI data, and environmental context data in the environmental telemetry data on a cloud orchestrator database and may associate the capability data, KPI data, and environmental context data in the environmental telemetry data with a user identification, peripheral device workspace identification, and device node identification.

At block 615, the peripheral device workspace cloud orchestrator server executes computer-readable program code of a telemetry ownership orchestrator module to determine the telemetry aggregation offloading when a utilization level threshold of the anchor information handling system node or another smart device node is exceeded. This determination allows the peripheral device workspace cloud orchestrator server to determine whether, based on the capability data, KPI data, and environmental context data in the environmental telemetry data, the telemetry aggregation responsibilities should be offloaded from the anchor information handling system node to a smart device node (e.g., a docking station) within the peripheral device workspace. The transitioning of this responsibility from the anchor information handling system node to the smart device node may generally depend on the current status of hardware processing resources, memory resources, network connectivity conditions or other utilization levels of the anchor information handling system node. For example, the environmental telemetry data in capability data may indicate the available hardware processing resources available at the anchor information handling system node based on current load on the hardware processing device on the anchor information handling system node as well as current operational context within the peripheral device workspace such as whether processing-intensive applications are being executed by the hardware processing device within the anchor information handling system node. Further, the capability data may indicate hardware processing capacity on other device nodes within the peripheral device workspace including the smart device node. For example, where the anchor information handling system node is initially responsible for aggregating the capability data, KPI data, and environmental context data in the environmental telemetry data for all the device nodes within the peripheral device workspace and the anchor information handling system node is executing a gaming application that requires a significant amount of hardware processing resources, this capability data, KPI data, and environmental context data in the environmental telemetry data gathered for the peripheral device workspace is used by the telemetry ownership orchestrator module to determine whether the telemetry aggregation responsibilities should be offloaded due to the hardware processing device of the anchor information handling system node being oversubscribed when completing this task. Similarly, memory utilization levels and network connectivity connections such as congestion, bandwidth or throughput limitations, wired conditions, or radio conditions may also be used during execution of the telemetry ownership orchestrator module for determination of offloading of environmental telemetry data gathering and processing for aggregation in the peripheral device workspace.

At block 620, the execution of the telemetry ownership orchestrator module determines whether the telemetry aggregation responsibilities should be offloaded from the anchor information handling system node to another smart device node within the peripheral device workspace. Where offloading of the telemetry data to another smart device node within the peripheral device workspace at block 620 is recommended, the method 600 continues to block 625 execution of code instructions of the telemetry ownership orchestrator module instructs the anchor information handling system node and smart device node to offload some portion of the environmental telemetry data collection and aggregation preparation responsibilities to the smart device node in an embodiment. Further, execution of the telemetry ownership orchestrator module may provide a response to the anchor information handling system node and the smart device node that the environmental telemetry data collection and aggregation preparation responsibilities are being offloaded to the smart device node in an embodiment. Where environmental telemetry data gathering and aggregation preparation responsibilities are not to be offloaded at block 620, the method 600 may continue to block 630.

At block 630, the peripheral device workspace cloud orchestrator server executes computer-readable program code of the workspace context discovery module to discover which node devices are operatively coupled to the anchor information handling system node that form the peripheral device workspace. During this discovery process, the anchor information handling system node may identify capabilities data associated with each of the device nodes within collected environmental telemetry data. Again, capabilities data may include video input/video output capabilities of the device node, audio input/audio output capabilities of the device node, network communication capabilities of the device node, processing capabilities of the device node, data storage capabilities of the device node, and wired connection capabilities of the device node (e.g., available ports), existing executable software/firmware stored on the device node, sensors present at the device node, security protocols present at the device node, among other capabilities. It is appreciated that any number of device nodes may have capabilities similar to other device nodes such that one capability of a device node may be selected over the same capability of another device node during the method 501 described herein. The capabilities data of device nodes in the peripheral device workspace may be utilized in execution of a workspace compatibility module of the peripheral device workspace cloud orchestrator to manage selection of peripheral device nodes to be used within a peripheral device workspace or for when a new peripheral device node is introduced or an old peripheral device is removed from the peripheral device workspace, in some example embodiments.

In an embodiment, the discovery of which node devices are operatively coupled to the anchor information handling system node that form the peripheral device workspace with identified capabilities data associated with each of the device nodes within collected environmental telemetry data may be used to determine a smart device node for offloading the collection and aggregation processing of environmental telemetry data from one or more peripheral device nodes within the peripheral device workspace. This capabilities data and environmental context data may indicate to the executing telemetry ownership orchestrator module at the peripheral device workspace cloud orchestrator server, which device node or device nodes have hardware processing resources, memory resources, or networking capabilities for offloading collection and aggregation processing of gathered environmental telemetry data from at least a portion of device nodes within the peripheral device workspace.

Execution of code instructions for the workspace context discovery module at block 630 also causes the peripheral device workspace cloud orchestrator server to generate mapping recommendations that describe which capabilities of which of the device nodes should be used within the peripheral device workspace including describing which peripheral device nodes are owned by a smart device node capable of receiving offloading and which are owned only by the anchor information handling system node. Again, the recommendations for mapped capabilities may depend on the operational, environmental context data of the anchor information handling system node as well as the KPI data received from the anchor information handling system node in the first instance. For example, where the environmental context data indicates that the user is currently executing a gaming application and is using a wireless headset to communicate with other users online, the environmental context data may indicate that the best option for audio input is not a microphone of an internal webcam on the anchor information handling system node but instead is the microphone present on the wireless headset. In such an example embodiment, the mapping recommendation of execution of the workspace context discovery module may indicate that the microphone for the internal webcam is to be muted or otherwise disabled while the microphone for the wireless headset is mapped as the primary audio input sensor to be used within the peripheral device workspace. The opposite may be mapped by the peripheral device workspace cloud orchestrator server where the environmental context data indicates that a videoconferencing application is being executed on the anchor information handling system node and the internal webcam is being used to provide video input during the videoconferencing session. In this example, the microphone for the wireless headset is to be muted while the microphone associated with the internal webcam is to be mapped as being the primary audio input device within the peripheral device workspace. This environmental context data may again change where, during the videoconferencing session, the wireless headset detects that the user has placed the wireless headset on the user's head. At this point, because the environmental context data has changed by the user wearing the wireless headset, the recommendation for mapping the capabilities of the device nodes may be provided such that the microphone associated with the internal webcam is not muted or otherwise disabled and the microphone of the wireless headset is now to be used as the primary audio input device within the peripheral device workspace. It is appreciated that detected KPIs may also be used during this mapping process such that processing performance KPIs, battery availability KPIs, audio KPIs, video KPIs, and the like are used to determine whether certain device nodes are capable of performing the functions required by the user in specific operational contexts of the anchor information handling system node.

Further, the recommendations for mapped capabilities may depend on the operational, environmental context data of the anchor information handling system node as well as the KPI data received from the anchor information handling system node as well as any smart device nodes that may be available for offloading of environmental telemetry data collection and aggregation processing. For example, where the environmental context data indicates that the user is currently executing a gaming application or videoconferencing application and is using a peripheral device node such as a wireless headset to communicate with other users online, the environmental context data may indicate that the anchor information handling system node is operatively coupled directly to this peripheral device node, but other peripheral device nodes are operatively coupled through a smart device node such as a smart dock to the anchor information handling system node. In such a case, the execution of code instructions for the workspace context discovery module may instead provide for mapped capabilities of the environmental context data for the smart node device and a portion of operatively coupled peripheral device nodes that it may "own" or administer to collection and aggregation processing of environmental telemetry data for a portion of the peripheral device workspace. Upon execution of code instructions of the telemetry ownership orchestrator module to determine that the processing resources, memory resources, or network connectivity has reached threshold utilization levels, instructions may be generated to the anchor information handling system and the identified smart device node to offload environmental telemetry data gathering and aggregation processing for some of the node devices that may be owned by the smart device node to ease the utilization burden on the anchor information handling system node. This will preserve the QoE for the user of the anchor information handling system node in the peripheral device workspace.

At block 635, the mapped capabilities, based on the current context and KPI data, are sent to the anchor information handling system node. In an embodiment, the execution of the cloud manageability orchestrator sub-agent may cause these mapped capabilities to be cached or otherwise stored on the anchor information handling system node in a data storage device of the anchor information handling system node such that an offload instruction from execution of code instructions of the telemetry ownership orchestrator module will indicate which smart device node will accommodate collection and aggregation processing of environmental telemetry data from a particular portion of node devices in the peripheral device workspace.

At block 640, the gathered environmental telemetry data with aggregation processing is received at the peripheral device workspace orchestrator server from one or both of the anchor information handling system node or smart device node depending on offloading status from the peripheral device workspace. Upon delivery of this aggregation processed environmental telemetry data from a combination of the anchor information handling system node for some portion of owned device nodes and separately via another network link from the smart node device for other node devices it owns, received environmental telemetry data may be aggregated at the peripheral device workspace orchestrator server for the peripheral device workspace. The execution of code instructions of the telemetry aggregator module at the peripheral device workspace orchestrator server may aggregate the received environmental telemetry data as sourced from the same peripheral device workspace and may further aggregate the environmental telemetry data based on other categorizations indicated in metadata added by the anchor information handling system node or the smart device node according to embodiments herein. Further at 640, the anchor information handling system node may monitor for any changes in environmental context data, KPI data, or capability data in the collected environmental telemetry data to determine whether a further adjustment to the offloading of the telemetry data aggregation should occur and/or whether the capabilities should be remapped. Where changes in the capability data, KPI data, and environmental context data in the environmental telemetry data is detected by execution of code instructions of the telemetry ownership module at the peripheral device workspace orchestrator server, the method 600 may return to block 615 as described herein to determine from the received environmental telemetry data with the indicated changes whether threshold utilization levels have changed at the anchor information handling system node or one or more smart device nodes to again adjust offloading of the environmental telemetry data collection and aggregation processing from one or more node devices back to the anchor information handling system node or even to an additional smart device node with networking capabilities. Where, however, no changes in the capability data, KPI data, and environmental context data in the environmental telemetry data are detected, the method 600 may end although continuous monitoring for changes may occur and the process may start over.

The blocks of the flow diagrams of FIGS. 3-6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of executing computer-readable program code of a telemetry ownership orchestrator module at a peripheral device workspace cloud orchestrator server for managing environmental telemetry data collection within a peripheral device workspace managed by the peripheral device workspace cloud orchestrator server comprising:

executing computer-readable program code of a telemetry aggregator module at a peripheral device workspace cloud orchestrator server with a hardware processing device to receive and aggregate environmental telemetry data having KPI data associated with device nodes within the peripheral device workspace, the KPI data in the environmental telemetry data received, via a network interface device, from an anchor information handing system node among the device nodes within the peripheral device workspace along with device node capabilities associated with each device node;

executing computer-readable program code of the telemetry ownership orchestrator module to map the environmental telemetry data received from the anchor information handling system node to each device node in the peripheral device workspace and determine, based on the KPI data and device node capabilities, whether telemetry data collection and aggregation functions are to be transitioned from the anchor information handling system node to a smart device node within the peripheral device workspace; and executing the computer-readable program code of the telemetry ownership orchestrator module to determine that a resource utilization level at the anchor information handling system has reached a first utilization threshold or that a processing-intensive application is being executed on the anchor information handling system node and transmitting a command to the peripheral device workspace to transition the telemetry data collection and aggregation functions from the anchor information handling system node to the smart device node.

2. The method of claim 1 further comprising:
the hardware processor to execute computer-readable program code of a cloud manageability orchestrator module to register each of the plurality of device nodes within the peripheral device workspace and create a manifest of the device nodes for storage with a peripheral device workspace identification value at a database operatively coupled to the peripheral device workspace cloud orchestrator server.

3. The method of claim 1 further comprising:
the hardware processor to execute computer-readable program code of an ecosystem manageability service module to apply the hardware device operational policies to the peripheral device workspace and identify those peripheral devices that form part of the peripheral device workspace having a peripheral device workspace identifier value and may propagate those hardware device operational policies that apply to those peripheral devices.

4. The method of claim 1, further comprising:
receiving, via the network interface device, the environmental telemetry data including device node capability data and key performance indicator (KPI) data that includes hardware processing resource utilization at the anchor information handling system node; and
executing the computer-readable program code of the telemetry ownership orchestrator module to determine that the hardware processing resource utilization is the resource utilization level that has reached the first utilization threshold for a processing resource of the anchor information handling system node.

5. The method of claim 1 further comprising:
receiving, via the network interface device, the environmental telemetry data including device node capability data and key performance indicator (KPI) data that includes memory resource utilization at the anchor information handling system node; and
executing the computer-readable program code of the telemetry ownership orchestrator module to determine that the memory resource utilization is the resource utilization level that has reached the first utilization threshold for a memory of the anchor information handling system node.

6. The method of claim 1 further comprising:
receiving, via the network interface device, the environmental telemetry data including device node capability data and key performance indicator (KPI) data that includes network connectivity resource utilization at the anchor information handling system node; and
executing the computer-readable program code of the telemetry ownership orchestrator module to determine that the network connectivity resource utilization is the resource utilization level that has reached the first utilization threshold for a network interface device of the anchor information handling system node.

7. The method of claim 1 further comprising:
receiving, via the network interface device, the environmental telemetry data including device node capability data and environmental telemetry data that includes data indicating that the processing-intensive application is being executed on the anchor information handling system node.

8. The method of claim 1 further comprising:
executing computer-readable program code of a workspace context discovery module to monitor for changes in the environmental telemetry data within a peripheral device workspace; and
transitioning, based on the changes in environmental telemetry data, the portion of environmental telemetry data collection and aggregation functions from the smart device node within the peripheral device workspace back to the anchor information handling system node when the resource utilization level at the anchor information handling system node is determined to have fallen below a second utilization threshold.

9. A peripheral device workspace cloud orchestrator server, comprising:
a hardware processor;
a memory device;
a power management unit (PMU) to provide power to the hardware processor and memory device;
a network interface device to receive environmental telemetry data including device node capability data and key performance indicator (KPI) data associated with a plurality of device nodes within a peripheral device workspace that includes an anchor information handling system node operatively coupled to a plurality of peripheral device nodes at a location;
the hardware processor to execute computer-readable program code of a telemetry aggregator module to aggregate the environmental telemetry data collected and received from the device nodes within the peripheral device workspace;
the hardware processor to execute computer-readable program code of a telemetry ownership orchestrator module to map the environmental telemetry data received from the anchor information handling system node and each peripheral device node of the plurality of peripheral device nodes in the peripheral device workspace and determine, based on the KPI data and device node capabilities, to offload a portion of environmental telemetry data collection and aggregation functions to be transitioned to a smart device node within the peripheral device workspace from the anchor information handling system node when a resource utilization level at the anchor information handling system node is determined to reach a utilization threshold; and
the hardware processor to execute the computer-readable program code of the telemetry ownership orchestrator module to transmit instructions to the anchor information handling system node to offload the portion of environmental telemetry data collection and aggregation functions for a subset of the plurality of peripheral device nodes in the peripheral device workspace to the smart device node.

10. The peripheral device workspace cloud orchestrator server of claim 9, further comprising:
the hardware processor to execute computer-readable program code of a cloud manageability orchestrator module to register and store identification of each of the plurality of device nodes within the peripheral device workspace and create a manifest of the device nodes to define the peripheral device workspace for association with a peripheral device workspace identification value in a database operatively coupled to the peripheral device workspace cloud orchestrator server.

11. The peripheral device workspace cloud orchestrator server of claim 9 further comprising:
the network interface device to receive environmental telemetry data including device node capability data and key performance indicator (KPI) data that includes hardware processing resource utilization at the anchor information handling system node; and
the hardware processor executing the computer-readable program code of the telemetry ownership orchestrator module to determine that the hardware processing resource utilization is the resource utilization level that has reached the utilization threshold for a processing resource of the anchor information handling system node.

12. The peripheral device workspace cloud orchestrator server of claim 9 further comprising:
the network interface device to receive environmental telemetry data including device node capability data and key performance indicator (KPI) data that includes memory resource utilization at the anchor information handling system node; and
the hardware processor executing the computer-readable program code of the telemetry ownership orchestrator module to determine that the memory resource utilization is the resource utilization level that has reached the utilization threshold for a memory of the anchor information handling system node.

13. The peripheral device workspace cloud orchestrator server of claim 9 further comprising:
the network interface device to receive environmental telemetry data including device node capability data and key performance indicator (KPI) data that includes network connectivity level resource utilization at the anchor information handling system node; and
the hardware processor executing the computer-readable program code of the telemetry ownership orchestrator module to determine that the network connectivity level resource utilization is the resource utilization level that has reached the utilization threshold for a network interface of the anchor information handling system node.

14. The peripheral device workspace cloud orchestrator server of claim 9 further comprising:
a cloud orchestrator database to store a peripheral device workspace identification value associated with the peripheral device workspace along with the aggregated KPI data for the peripheral device workspace, a peripheral device workspace manifest, and orchestrated device descriptor (ODD) values that provide features, configurations, and other environmental context data associated with each of the device nodes within the peripheral device workspace.

15. The peripheral device workspace cloud orchestrator server of claim 9 further comprising:
the hardware processor to execute computer-readable program code of an ecosystem manageability service module to apply one or more hardware device operational policies to the peripheral device workspace and identify the plurality of peripheral device nodes that form part of the peripheral device workspace and propagate those hardware device operational policies that apply to the plurality of peripheral device nodes.

16. The peripheral device workspace cloud orchestrator server of claim 9 further comprising:
the hardware processor to execute computer-readable program code of a workspace context discovery module to monitor for changes in the environmental telemetry data within a peripheral device workspace, update a manifest of the peripheral device workspace, and provide analysis of device node capabilities of each device node within the peripheral device workspace for the workspace context discovery module to map the capabilities; and
the hardware processor to execute the computer-readable program code of the telemetry ownership orchestrator module determining, based on the changes in environmental telemetry data and device node capabilities, to alter the instruction to offload the portion of environmental telemetry data collection and aggregation functions to be transitioned from the smart device node within the peripheral device workspace back to the anchor information handling system node when the resource utilization level at the anchor information handling system node is determined to have fallen below a second utilization threshold.

17. A peripheral device workspace cloud orchestrator server, comprising:
a hardware processor;
a memory device;
a power management unit (PMU) to provide power to the hardware processor and memory device;
a network interface device to receive environmental telemetry data including device node capability data and key performance indicator (KPI) data associated with a plurality of device nodes within a peripheral device workspace at a location including an anchor information handling system node;
the hardware processor to execute computer-readable program code of a telemetry aggregator module to aggregate the environmental telemetry data associated with the device nodes within the peripheral device workspace;
the hardware processor to execute computer-readable program code of a telemetry ownership orchestrator module to map the environmental telemetry data received from the anchor information handling system node to records for each device node in the peripheral device workspace stored in a database;
the hardware processor to execute computer-readable program code of a telemetry ownership orchestrator module determine, based on the KPI data and device node capability data, whether telemetry collection and aggregation functions are to be transitioned from the anchor information handling system node to a smart device node within the peripheral device workspace;
the hardware processor to execute computer-readable program code of a workspace context discovery module to map the capabilities of each device node within the peripheral device workspace based on a usage context in which a type of peripheral device node among the node devices is needed operate with the anchor information handling system executing an identified software application;
the hardware processor to execute computer-readable program code of a workspace capability orchestrator module to, based on the KPI data and usage context associated with the anchor information handling system node executing the identified software application within the peripheral device workspace, provide peripheral device workspace recommendations to select a first device node among a plurality of device nodes having overlapping capabilities within the peripheral device workspace; and the hardware processor to execute computer-readable program code of a cloud orchestrator notification module to generate and transmit to the anchor information handling system within the peripheral device workspace an instruction selecting the first device node and indication that overlapping capabilities associated with other device nodes are no longer available within the peripheral device workspace.

18. The peripheral device workspace cloud orchestrator server of claim 17 further comprising:

the hardware processor to execute computer-readable program code of an ecosystem manageability service module to apply the hardware device operational policies to the peripheral device workspace and identify those peripheral devices that form part of the peripheral device workspace having a peripheral device workspace identification value to propagate those hardware device operational policies for application to those peripheral devices.

19. The peripheral device workspace cloud orchestrator server of claim 17 further comprising:

a peripheral device workspace cloud orchestrator to create and transmit the hardware device operational policies that define selection among the device nodes with the overlapping capabilities within the peripheral device workspace determined from the received environmental telemetry data for execution of the identified software applications by the anchor information handling system node.

20. The peripheral device workspace cloud orchestrator server of claim 17 further comprising:

a cloud orchestrator database to store a peripheral device workspace identification value associated with the peripheral device workspace, the KPI data, a peripheral device workspace manifest, and orchestrated device descriptor (ODD) values that provide features, configurations, and other environmental context data associated with each of the device nodes within the peripheral device workspace.

* * * * *